(12) United States Patent
Lung

(10) Patent No.: US 11,636,325 B2
(45) Date of Patent: Apr. 25, 2023

(54) IN-MEMORY DATA POOLING FOR MACHINE LEARNING

(71) Applicant: MACRONIX INTERNATIONAL CO., LTD., Hsinchu (TW)

(72) Inventor: Hsiang-Lan Lung, Kaohsiung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 1127 days.

(21) Appl. No.: 16/169,345

(22) Filed: Oct. 24, 2018

(65) Prior Publication Data

US 2020/0134437 A1    Apr. 30, 2020

(51) Int. Cl.
*G06N 3/063* (2023.01)
*G06N 3/065* (2023.01)
*G06F 17/16* (2006.01)
*G06F 17/18* (2006.01)

(52) U.S. Cl.
CPC ............ *G06N 3/065* (2023.01); *G06F 17/16* (2013.01); *G06F 17/18* (2013.01)

(58) Field of Classification Search
CPC .... G06N 3/0635; G06N 3/0454; G06N 3/063; G06F 17/16; G06F 17/18
USPC .......................................................... 706/15
See application file for complete search history.

(56) References Cited

U.S. PATENT DOCUMENTS

| | | | |
|---|---|---|---|
| 4,219,829 A | 8/1980 | Dorda et al. | |
| 4,987,090 A | 1/1991 | Hsu et al. | |
| 5,029,130 A | 7/1991 | Yeh | |
| 5,586,073 A | 12/1996 | Hiura et al. | |
| 6,107,882 A | 8/2000 | Gabara et al. | |
| 6,313,486 B1 | 11/2001 | Kencke et al. | |
| 6,829,598 B2 | 12/2004 | Milev | |
| 6,906,940 B1 | 6/2005 | Lue | |
| 6,960,499 B2 | 11/2005 | Nandakumar et al. | |

(Continued)

FOREIGN PATENT DOCUMENTS

| CN | 101432821 A | 5/2009 |
|---|---|---|
| CN | 1998012 B | 11/2010 |

(Continued)

OTHER PUBLICATIONS

EP Extended Search Report from 18155279.5-1203 dated Aug. 30, 2018, 8 pages.

(Continued)

*Primary Examiner* — Tan V Mai
(74) *Attorney, Agent, or Firm* — Andrew L. Dunlap; Haynes Beffel & Wolfeld LLP

(57) ABSTRACT

A method comprises a first block of memory cells to store an input array, and a second block of memory cells. Pooling circuitry is operatively coupled to the first block of memory cells to execute in-place pooling according to a function over the input array to generate an array of output values. Writing circuitry is operatively coupled to the second block to store the array of output values in the second block of memory cells. Analog sensing circuitry is coupled to the first block of memory cells to generate analog values for the input array, wherein the pooling circuitry receives the analog values as inputs to the function. The writing circuitry operatively coupled to the second block is configured to store an analog level in each cell of the second block for the array of output values.

21 Claims, 15 Drawing Sheets

(56) References Cited

U.S. PATENT DOCUMENTS

| | | |
|---|---|---|
| 7,089,218 B1 | 8/2006 | Visel |
| 7,368,358 B2 | 5/2008 | Ouyang et al. |
| 7,436,723 B2 | 10/2008 | Rinerson et al. |
| 7,747,668 B2 | 6/2010 | Nomura et al. |
| 8,203,187 B2 | 6/2012 | Lung et al. |
| 8,275,728 B2 | 9/2012 | Pino |
| 8,432,719 B2 | 4/2013 | Lue |
| 8,589,320 B2 | 11/2013 | Breitwisch et al. |
| 8,630,114 B2 | 1/2014 | Lue |
| 8,725,670 B2 | 5/2014 | Visel |
| 8,860,124 B2 | 10/2014 | Lue et al. |
| 9,064,903 B2 | 6/2015 | Mitchell et al. |
| 9,147,468 B1 | 9/2015 | Lue |
| 9,213,936 B2 | 12/2015 | Visel |
| 9,379,129 B1 | 6/2016 | Lue et al. |
| 9,391,084 B2 | 7/2016 | Lue |
| 9,430,735 B1 | 8/2016 | Vali et al. |
| 9,431,099 B2 | 8/2016 | Lee et al. |
| 9,524,980 B2 | 12/2016 | Lue |
| 9,535,831 B2 | 1/2017 | Jayasena et al. |
| 9,536,969 B2 | 1/2017 | Yang et al. |
| 9,589,982 B1 | 3/2017 | Cheng et al. |
| 9,698,156 B2 | 7/2017 | Lue |
| 9,698,185 B2 | 7/2017 | Chen et al. |
| 9,710,747 B2 | 7/2017 | Kang et al. |
| 9,747,230 B2 | 8/2017 | Han et al. |
| 9,754,953 B2 | 9/2017 | Tang et al. |
| 9,767,028 B2 | 9/2017 | Cheng et al. |
| 9,898,207 B2 | 2/2018 | Kim et al. |
| 9,910,605 B2 | 3/2018 | Jayasena et al. |
| 9,978,454 B2 | 5/2018 | Jung |
| 9,983,829 B2 | 5/2018 | Ravimohan et al. |
| 9,991,007 B2 | 6/2018 | Lee et al. |
| 10,037,167 B2 | 7/2018 | Kwon et al. |
| 10,056,149 B2 | 8/2018 | Yamada et al. |
| 10,073,733 B1 | 9/2018 | Jain et al. |
| 10,157,012 B2 | 12/2018 | Kelner et al. |
| 10,175,667 B2 | 1/2019 | Bang et al. |
| 10,242,737 B1 | 3/2019 | Lin et al. |
| 10,528,643 B1 | 1/2020 | Choi et al. |
| 10,534,840 B1 | 1/2020 | Petti |
| 10,565,494 B2 | 2/2020 | Henry et al. |
| 10,635,398 B2 | 4/2020 | Lin et al. |
| 10,643,713 B1 | 5/2020 | Louie et al. |
| 10,719,296 B2 | 7/2020 | Lee et al. |
| 10,777,566 B2 | 9/2020 | Lue |
| 10,783,963 B1 | 9/2020 | Hung et al. |
| 10,825,510 B2 | 11/2020 | Jaiswal et al. |
| 10,860,682 B2 | 12/2020 | Knag et al. |
| 10,942,673 B2 * | 3/2021 | Shafiee Ardestani ............. G06F 3/0659 |
| 10,957,392 B2 | 3/2021 | Lee et al. |
| 11,410,028 B2 * | 8/2022 | Crill ..................... G06N 3/0675 |
| 2003/0122181 A1 | 7/2003 | Wu |
| 2005/0088878 A1 | 4/2005 | Eshel |
| 2005/0287793 A1 | 12/2005 | Blanchet et al. |
| 2010/0182828 A1 | 7/2010 | Shima et al. |
| 2010/0202208 A1 | 8/2010 | Endo et al. |
| 2011/0063915 A1 | 3/2011 | Tanaka et al. |
| 2011/0106742 A1 | 5/2011 | Pino |
| 2011/0128791 A1 | 6/2011 | Chang et al. |
| 2011/0194357 A1 | 8/2011 | Han et al. |
| 2011/0286258 A1 | 11/2011 | Chen et al. |
| 2011/0297912 A1 | 12/2011 | Samachisa et al. |
| 2012/0007167 A1 | 1/2012 | Hung et al. |
| 2012/0044742 A1 | 2/2012 | Narayanan |
| 2012/0182801 A1 | 7/2012 | Lue |
| 2012/0235111 A1 | 9/2012 | Osano et al. |
| 2012/0254087 A1 | 10/2012 | Visel |
| 2013/0070528 A1 | 3/2013 | Maeda |
| 2013/0075684 A1 | 3/2013 | Kinoshita et al. |
| 2014/0043898 A1 | 2/2014 | Kuo et al. |
| 2014/0063949 A1 | 3/2014 | Tokiwa |
| 2014/0119127 A1 | 5/2014 | Lung et al. |
| 2014/0149773 A1 | 5/2014 | Huang et al. |
| 2014/0268996 A1 | 9/2014 | Park |
| 2014/0330762 A1 | 11/2014 | Visel |
| 2015/0008500 A1 | 1/2015 | Fukumoto et al. |
| 2015/0171106 A1 | 6/2015 | Suh |
| 2015/0199126 A1 | 7/2015 | Jayasena et al. |
| 2015/0331817 A1 | 11/2015 | Han et al. |
| 2016/0141337 A1 | 5/2016 | Shimabukuro et al. |
| 2016/0181315 A1 | 6/2016 | Lee et al. |
| 2016/0232973 A1 | 8/2016 | Jung |
| 2016/0247579 A1 | 8/2016 | Ueda et al. |
| 2016/0308114 A1 | 10/2016 | Kim et al. |
| 2016/0336064 A1 | 11/2016 | Seo et al. |
| 2016/0342892 A1 | 11/2016 | Ross |
| 2016/0342893 A1 | 11/2016 | Ross et al. |
| 2016/0358661 A1 | 12/2016 | Vali et al. |
| 2017/0003889 A1 | 1/2017 | Kim et al. |
| 2017/0025421 A1 | 1/2017 | Sakakibara et al. |
| 2017/0092370 A1 | 3/2017 | Harari |
| 2017/0103316 A1 | 4/2017 | Ross et al. |
| 2017/0123987 A1 | 5/2017 | Cheng et al. |
| 2017/0148517 A1 | 5/2017 | Harari |
| 2017/0160955 A1 | 6/2017 | Jayasena et al. |
| 2017/0169885 A1 | 6/2017 | Tang et al. |
| 2017/0169887 A1 | 6/2017 | Widjaja |
| 2017/0263623 A1 | 9/2017 | Zhang et al. |
| 2017/0270405 A1 | 9/2017 | Kurokawa |
| 2017/0309634 A1 | 10/2017 | Noguchi et al. |
| 2017/0316833 A1 | 11/2017 | Ihm et al. |
| 2017/0317096 A1 | 11/2017 | Shin et al. |
| 2017/0337466 A1 | 11/2017 | Bayat et al. |
| 2018/0113649 A1 | 4/2018 | Shafiee Ardestani et al. |
| 2018/0121790 A1 | 5/2018 | Kim et al. |
| 2018/0129424 A1 | 5/2018 | Confalonieri et al. |
| 2018/0129936 A1 | 5/2018 | Young et al. |
| 2018/0144240 A1 | 5/2018 | Garbin et al. |
| 2018/0157488 A1 | 6/2018 | Shu et al. |
| 2018/0173420 A1 | 6/2018 | Li et al. |
| 2018/0189640 A1 | 7/2018 | Henry et al. |
| 2018/0240522 A1 | 8/2018 | Jung |
| 2018/0246783 A1 | 8/2018 | Avraham et al. |
| 2018/0247195 A1 | 8/2018 | Kumar et al. |
| 2018/0286874 A1 | 10/2018 | Kim et al. |
| 2018/0321942 A1 | 11/2018 | Yu et al. |
| 2018/0342299 A1 | 11/2018 | Yamada et al. |
| 2018/0350823 A1 | 12/2018 | Or-Bach et al. |
| 2019/0019538 A1 | 1/2019 | Li et al. |
| 2019/0019564 A1 | 1/2019 | Li et al. |
| 2019/0035449 A1 | 1/2019 | Saida et al. |
| 2019/0043560 A1 | 2/2019 | Sumbul et al. |
| 2019/0065151 A1 | 2/2019 | Chen et al. |
| 2019/0088329 A1 | 3/2019 | Tiwari et al. |
| 2019/0102170 A1 | 4/2019 | Chen et al. |
| 2019/0138892 A1 | 5/2019 | Kim et al. |
| 2019/0148393 A1 | 5/2019 | Lue |
| 2019/0164044 A1 | 5/2019 | Song et al. |
| 2019/0164617 A1 | 5/2019 | Tran et al. |
| 2019/0213234 A1 | 7/2019 | Bayat et al. |
| 2019/0220249 A1 | 7/2019 | Lee et al. |
| 2019/0244662 A1 | 8/2019 | Lee et al. |
| 2019/0286419 A1 | 9/2019 | Lin et al. |
| 2019/0311243 A1 | 10/2019 | Whatmough et al. |
| 2019/0311749 A1 | 10/2019 | Song et al. |
| 2019/0325959 A1 | 10/2019 | Bhargava et al. |
| 2019/0340497 A1 | 11/2019 | Baraniuk et al. |
| 2019/0363131 A1 | 11/2019 | Torng et al. |
| 2020/0026993 A1 | 1/2020 | Otsuka |
| 2020/0065650 A1 | 2/2020 | Tran et al. |
| 2020/0110990 A1 | 4/2020 | Harada et al. |
| 2020/0117986 A1 | 4/2020 | Burr et al. |
| 2020/0118638 A1 | 4/2020 | Leobandung et al. |
| 2020/0160165 A1 | 5/2020 | Sarin |
| 2020/0334015 A1 | 10/2020 | Shibata et al. |
| 2021/0240945 A1 | 8/2021 | Strachan et al. |

FOREIGN PATENT DOCUMENTS

| | | |
|---|---|---|
| CN | 103778468 A | 5/2014 |
| CN | 105718994 A | 6/2016 |
| CN | 105789139 A | 7/2016 |

(56) References Cited

FOREIGN PATENT DOCUMENTS

| | | |
|---|---|---|
| CN | 106530210 A | 3/2017 |
| CN | 107077879 A | 8/2017 |
| CN | 107533459 A | 1/2018 |
| CN | 107767905 A | 3/2018 |
| CN | 108268946 A | 7/2018 |
| EP | 2048709 A2 | 4/2009 |
| JP | H0451382 A | 2/1992 |
| JP | 2006127623 A | 5/2006 |
| JP | 2009080892 A | 4/2009 |
| TW | 201108230 A | 3/2011 |
| TW | 201523838 A | 6/2015 |
| TW | 201618284 A | 5/2016 |
| TW | 201639206 A | 11/2016 |
| TW | 201715525 A | 5/2017 |
| TW | 201732824 A | 9/2017 |
| TW | 201741943 A | 12/2017 |
| TW | 201802800 A | 1/2018 |
| TW | 201822203 A | 6/2018 |
| WO | 2012009179 A1 | 1/2012 |
| WO | 2012015450 A1 | 2/2012 |
| WO | 2016060617 A1 | 4/2016 |
| WO | 2017091338 A1 | 6/2017 |
| WO | 2018201060 A1 | 11/2018 |

OTHER PUBLICATIONS

EP Extended Search Report from EP18158099.4 dated Sep. 19, 2018, 8 pages.

Schuller et al., "Neuromorphic Computing: From Materials to Systems Architecture," US Dept. of Energy, Oct. 29-30, 2015, Gaithersburg, MD, 40 pages.

Soudry, et al. "Hebbian learning rules with memristors," Center for Communication and Information Technologies CCIT Report #840, Sep. 1, 2013, 16 pages.

U.S. Appl. No. 15/873,369, filed Jan. 17, 2018, entitled "Sum-Of-Products Accelerator Array," Lee et al., 52 pages.

U.S. Appl. No. 15/887,166, filed Feb. 2, 2018, entitled "Sum-Of-Products Array for Neuromorphic Computing System," Lee et al., 49 pages.

U.S. Appl. No. 15/895,369, filed Feb. 13, 2018, entitled "Device Structure for Neuromorphic Computing System," Lin et al., 34 pages.

U.S. Appl. No. 15/922,359, filed Mar. 15, 2018, entitled "Voltage Sensing Type of Matrix Multiplication Method for Neuromorphic Computing System," Lin et al., 40 pages.

U.S. Office Action in U.S. Appl. No. 15/887,166 dated Jan. 30, 2019, 18 pages.

TW Office Action in 108100557 dated Mar. 13, 2020, 13 pages.

Jang et al., "Vertical cell array using TCAT(Terabit Cell Array Transistor) technology for ultra high density NAND flash memory," 2009 Symposium on VLSI Technology, Honolulu, HI, Jun. 16-18, 2009, pp. 192-193.

Kim et al. "Multi-Layered Vertical Gate NAND Flash Overcoming Stacking Limit for Terabit Density Storage," 2009 Symposium on VLSI Technology Digest of Papers, Jun. 16-18, 2009, 2 pages.

Kim et al. "Novel Vertical-Stacked-Array-Transistor (VSAT) for Ultra-High-Density and Cost-Effective NAND Flash Memory Devices and SSD (Solid State Drive)", Jun. 2009 Symposium on VLSI Technolgy Digest of Technical Papers, pp. 186-187.

Ohzone et al., "Ion-Implanted Thin Polycrystalline-Silicon High-Value Resistors for High-Density Poly-Load Static RAM Applications," IEEE Trans. on Electron Devices, vol. ED-32, No. 9, Sep. 1985, 8 pages.

Sakai et al., "A Buried Giga-Ohm Resistor (BGR) Load Static RAM Cell," IEEE Symp. on VLSI Technology, Digest of Papers, Sep. 10-12, 1984, 2 pages.

Seo et al., "A Novel 3-D Vertical FG NAND Flash Memory Cell Arrays Using the Separated Sidewall Control Gate (S-SCG) for Highly Reliable MLC Operation," 2011 3rd IEEE International Memory Workshop (IMW), May 22-25, 2011, 4 pages.

Tanaka H., et al., "Bit Cost Scalable Technology with Punch and Plug Process for Ultra High Density Flash Memory," 2007 Symp. VLSI Tech., Digest of Tech. Papers, pp. 14-15.

U.S. Appl. No. 16/037,281, filed Jul. 17, 2018, 87 pages.

Whang, SungJin et al. "Novel 3-dimensional Dual Control-gate with Surrounding Floating-gate (DC-SF) NAND flash cell for 1Tb file storage application," 2010 IEEE Int'l Electron Devices Meeting (IEDM), Dec. 6-8, 2010, 4 pages.

Anonymous, "Data in the Computer", May 11, 2015, pp. 1-8, https://web.archive.org/web/20150511143158/https://homepage.es.uri.edu/faculty/wolfe/book/Readings/Reading02.htm (Year: 2015)—See Office Action dated Aug. 17, 2020 in U.S. Appl. No. 16/279,494 for relevance—no year provided by examiner.

Aritome, et al., "Reliability issues of flash memory cells," Proc. of the IEEE, vol. 81, No. 5, May 1993, pp. 776-788.

Chen et al., "A Highly Pitch Scalable 3D Vertical Gate (VG) NAND Flash Decoded by a Novel Self-Aligned Independently Controlled Double Gate (IDG) StringSelect Transistor (SSL)," 2012 Symp. on VLSI Technology (VLSIT), Jun. 12-14, 2012, pp. 91-92.

Chen et al., "Eyeriss: An Energy-Efficient reconfigurable accelerator for deep convolutional neural networks," IEEE ISSCC, Jan. 31-Feb. 4, 2016, 3 pages.

Choi et al., "Performance Breakthrough in NOR Flash Memory With Dopant-Segregated Schottky-Barrier (DSSB) SONOS Devices," Jun. 2009 Symposium on VLSITechnology Digest of Technical Papers, pp. 222-223.

EP Extended Search Report from EP19193290.4 dated Feb. 14, 2020, 10 pages.

Fukuzumi et al. "Optimal Integration and Characteristics of Vertical Array Devices for Ultra-High Density, Bit-Cost Scalable Flash Memory," IEEE Dec. 2007, pp. 449-452.

Gonugondla et al., "Energy-Efficient Deep In-memory Architecture for NAND Flash Memories," IEEE International Symposium on Circuits and Systems (ISCAS), May 27-30, 2018, 5 pages.

Guo et al., "Fast, energy-efficient, robust, and reproducible mixed-signal neuromorphic classifier based on embedded NOR flash memory technology," IEEE Int'l Electron Devices Mtg., San Francisco, CA, Dec. 2-6, 2017, 4 pages.

Hsu et al., "Study of Sub-30nm Thin Film Transistor (TFT) Charge-Trapping (CT) Devices for 3D NAND Flash Application," 2009 IEEE, Dec. 7-9, 2009, pp. 27.4.1-27.4.4.

Hubert et al., "A Stacked SONOS Technology, Up to 4 Levels and 6nm Crystalline Nanowires, With Gate-All-Around or Independent Gates (Flash), Suitable for Full 3D Integration," IEEE 2009, Dec. 7-9, 2009, pp. 27.6 1-27.6 4.

Hung et al., "A highly scalable vertical gate (VG) 3D NAND Flash with robust program disturb immunity using a novel PN diode decoding structure," 2011 Symp. on VLSI Technology (VLSIT), Jun. 14-16, 2011, pp. 68-69.

JP Office Action in Application No. JP 2019-166959 dated Nov. 16, 2021 with English Machine Translation, 9 pages.

Jung et al, "Three Dimensionally Stacked NAND Flash Memory Technology Using Stacking Single Crystal Si Layers on ILD and TANOS Structure for Beyond 30nm Node," International Electron Devices Meeting, 2006. IEDM '06, Dec. 11-13, 2006, pp. 1-4.

Katsumata et al., "Pipe-shaped BiCS Flash Memory With 16 Stacked Layers and Multi-Level-Cell Operation for Ultra High Density Storage Devices," 2009 Symposium on VLSI Technology Digest of Technical Papers, Jun. 16-18, 2009, pp. 136-137.

Kim et al., "Novel 3-D Structure for Ultra High Density Flash Memory with VRAT (Vertical-Recess-Array-Transistor) and PIPE (Planarized Integration on the same PlanE)," IEEE 2008 Symposium on VLSI Technology Digest of Technical Papers, Jun. 17-19, 2008, pp. 122-123.

Kim et al., "Three-Dimensional NAND Flash Architecture Design Based on Single-Crystalline STacked ARray," IEEE Transactions on Electron Devices, vol. 59, No. 1, pp. 35-45, Jan. 2012.

Lai et al., "A Multi-Layer Stackable Thin-Film Transistor (TFT) NAND-Type Flash Memory," Electron Devices Meeting, 2006, IEDM '06 International, Dec. 11-13, 2006, pp. 1-4.

Liu et al., "Parallelizing SRAM Arrays with Customized Bit-Cell for Binary Neural Networks," 55th ACM/ESDA/IEEE Design Automation Conference (DAC), Sep. 20, 2018, 4 pages.

(56) References Cited

OTHER PUBLICATIONS

Lue et al., "A Highly Scalable 8-Layer 3D Vertical-Gate (VG) TFT NAND Flash Using Junction-Free Buried Channel BE-SONOS Device", 2010 Symposium on VLSI Technology Digest of Technical Papers, pp. 131-132, Jun. 15-17, 2010.
Lue et al., "A Novel 3D AND-type NVM Architecture Capable of High-density, Low-power In-Memory Sum-of-Product Computation for Artificial Intelligence Application," IEEE VLSI, Jun. 18-22, 2018, 2 pages.
Merrikh-Bayat et al., "High-Performance Mixed-Signal Neurocomputing with Nanoscale Flowting-Gate Memory Cell Arrays," in IEEE Transactions on Neural Netowrks and Learning Systems, vol. 29, No. 10, Oct. 2018, pp. 4782-4790.
Nowak et al., "Intrinsic fluctuations in Vertical NAND flash memories," 2012 Symposium on VLSI Technology, Digest of Technical Papers, pp. 21-22, Jun. 12-14, 2012.
Rod Nussbaumer, "How is data transmitted through wires in the computer?", Aug. 27, 2015, pp. 1-3, https://vww.quora.com/ How-is-data-transmitted-through-wires-in-the-computer (Year: 2015)—See Office Action dated Aug. 17, 2020 in U.S. Appl. No. 16/279,494 for relevance—No year provided by examiner.
Scott Thornton, "What is DRAm (Dynamic Random Access Memory) vs SRAM?", Jun. 22, 2017, pp. 1-11, https://www.microcontrollertips.com/dram-vs-sram/ (Year: 2017)—See Office Action dated Aug. 17, 2020 in U.S. Appl. No. 16/279,494 for relevance—no year provided by examiner.
TW Office Action from TW Application No. 10820980430, dated Oct. 16, 2019, 6 pages (with English Translation).
U.S. Office Action in U.S. Appl. No. 15/873,369 dated May 9, 2019, 8 pages.
U.S. Office Action in U.S. Appl. No. 15/873,369 dated Dec. 4, 2019, 5 pages.
U.S. Office Action in U.S. Appl. No. 15/887,166 dated Jul. 10, 2019, 18 pages.
U.S. Office Action in U.S. Appl. No. 15/922,359 dated Oct. 11, 2019, 7 pages.
U.S. Office Action in U.S. Appl. No. 15/922,359 dated Jun. 24, 2019, 8 pages.
U.S. Office Action in U.S. Appl. No. 16/037,281 dated Dec. 19, 2019, 9 pages.
U.S. Office Action in U.S. Appl. No. 16/224,602 dated Nov. 23, 2020, 14 pages.
U.S. Office Action in U.S. Appl. No. 16/224,602 dated Mar. 24, 2021, 17 pages.
U.S. Office Action in U.S. Appl. No. 16/233,404 dated Jul. 30, 2020, 20 pages.
U.S. Office Action in U.S. Appl. No. 16/233,414 dated Apr. 20, 2020, 17 pages.
U.S. Office Action in U.S. Appl. No. 16/233,414 dated Oct. 31, 2019, 22 pages.
U.S. Office Action in U.S. Appl. No. 16/279,494 dated Nov. 12, 2020, 25 pages.
U.S. Office Action in U.S. Appl. No. 16/279,494 dated Aug. 17, 2020, 25 pages.
U.S. Office Action in U.S. Appl. No. 16/297,504 dated Feb. 4, 2020, 15 pages.
U.S. Office Action in U.S. Appl. No. 16/359,919 dated Mar. 3, 2021, 15 pages.
U.S. Office Action in U.S. Appl. No. 16/359,919 dated Oct. 16, 2020, 13 pages.
U.S. Office Action in U.S. Appl. No. 16/450,334 dated Aug. 4, 2022, 20 pages.
U.S. Office Action in U.S. Appl. No. 16/508,189 dated Aug. 8, 2022, 23 pages.
Wang et al., "Three-Dimensional NAND Flash for Vector-Matrix Multiplication," IEEE Trans. on Very Large Scale Integration Systems (VLSI), vol. 27, No. 4, Apr. 2019, 4 pages.
Wang, Michael, "Technology Trends on 3D-NAND Flash Storage", Impact 2011, Taipei, dated Oct. 20, 2011, found at www.impact.org.tw/2011/Files/NewsFile/201111110190.pdf.
Webopedia, "DRAM—dynamic random access memory", Jan. 21, 2017, pp. 1-3, https://web.archive.org/web/20170121124008/https://www.webopedia.com/TERM/D/DRAM.html (Year: 2017)—See Office Action dated Aug. 17, 2020 in U.S. Appl. No. 16/279,494 for relevance—no year provided by examiner.
Webopedia, "SoC", Oct. 5, 2011, pp. 1-2, https://web.archive.org/web/20111005173630/https://www.webopedia.com/ TERM/S/SoC.html (Year: 2011)—See Office Action dated Aug. 17, 2020 in U.S. Appl. No. 16/279,494 for relevance—no month provided by examiner.
Webopedia, "volatile memory", Oct. 9, 2017, pp. 1-4, https://web.archive.org/web/20171009201852/https://vww.webopedia.com/TERMN/volatile_memory.html (Year: 2017)—See Office Action dated Aug. 17, 2020 in U.S. Appl. No. 16/279,494 for relevance—no year provided by examiner.
Y.X. Liu et al., "Comparative Study of Tri-Gate and Double-Gate-Type Poly-Si Fin-Channel Spli-Gate Flash Memories," 2012 IEEE Silicon Nanoelectronics Workshop (SNW), Honolulu, HI, Jun. 10-11, 2012, pp. 1-2.

\* cited by examiner

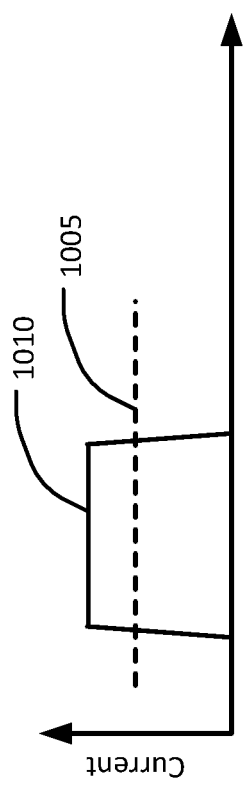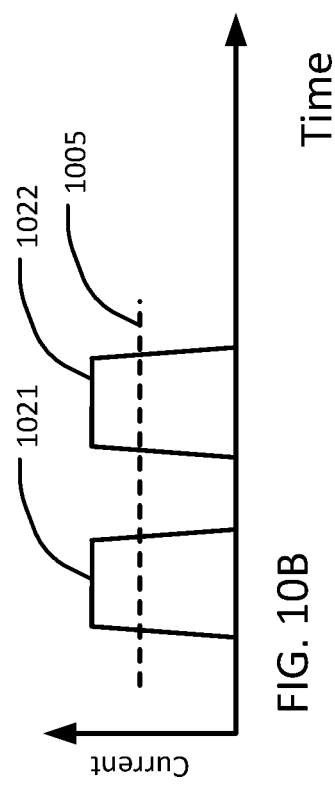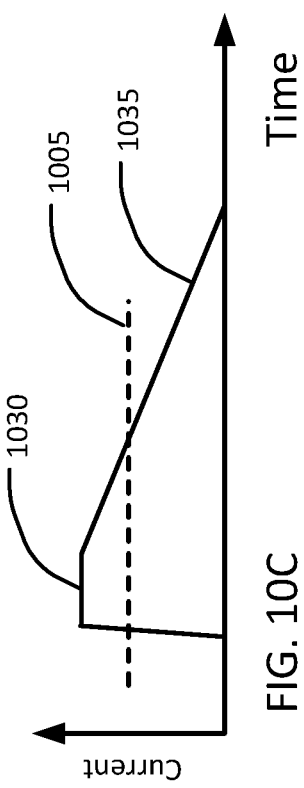

IN-MEMORY DATA POOLING FOR MACHINE LEARNING

BACKGROUND

Field

The present invention relates to circuitry that can be used to perform in-memory compression for machine learning.

Description of Related Art

Convolutional neural networks (CNN) are used in machine learning with applications in fields such as speech recognition, computer vision and text processing. CNN operations can be implemented using a system that includes graphics processing units (GPU) and dynamic random access memory (DRAM) coupled to the GPU. In such a system, data is frequently moved between multiple GPUs and DRAMs for convolution and pooling operations, through components on printed circuit boards such as conductive traces and pads. However, such data movement can consume a significant amount of power and slow down the performance.

It is desirable to provide a device for pooling operations that can improve the performance and reduce power consumption.

SUMMARY

The present invention provides a device comprising a first block of memory cells to store an input array and a second block of memory cells. Pooling circuitry operatively is coupled to the first block of memory cells to execute in-place pooling according to a function over the input array to generate an array of output values. Writing circuitry operatively is coupled to the second block to store the array of output values in the second block of memory cells. Analog sensing circuitry is coupled to the first block of memory cells to generate analog values for the input array; and wherein the pooling circuitry receives the analog values as inputs to the function. The writing circuitry operatively coupled to the second block is configured to store an analog level in each cell of the second block for the array of output values.

As used herein, an analog level can be stored without verify cycles to verify that the cell has been changed to the target resistance or threshold range corresponding to a particular digital value. Storing output values in the second block of memory cells as analog levels instead of digital values can improve the performance for storing the output values in the array of output values, because the verify cycles are not needed.

As used herein, "in-place pooling" refers to pooling according to a function over an input array to generate an array of output values, where the input array is stored in an addressable memory before the pooling, the pooling is executed while the input array remains stored in the same addressable memory, and is not moved to another addressable memory before or during the execution of the pooling.

For a set of frames of cells in the input array, in one embodiment, the function can determine a maximum analog value among cells in each frame in the set of frames to generate the array of output values, where each output value in the array of output values corresponds to a frame in the set of frames, and indicates the maximum analog value among the cells in the frame in the set of frames. In an alternative embodiment, the function can determine an average analog value among cells in each frame in the set of frames to generate the array of output values. In yet another alternative embodiment, the function can determine a minimum analog value among cells in each frame in the set of frames to generate the array of output values. In yet another alternative embodiment, the function can determine a sum of analog values among cells in each frame in the set of frames to generate the array of output values. Pooling can reduce the dimensionality of an input array and reduce the number of computations involving the input array in convolutional neural networks, while retaining the most important information in the input array.

The device includes address generation circuits that apply addresses for a set of frames to the first block in coordination with the pooling circuitry.

The writing circuitry can apply a sequence of write pulses for each cell in the second block having a number of write pulses determined according to a corresponding output value in the array of output values. The writing circuitry can apply a sequence of write pulses for each cell in the second block having a pulse duration determined according to a corresponding output value in the array of output values. The writing circuitry can apply a sequence of write pulses for each cell in the second block having a tail length of a write pulse determined according to a corresponding output value in the array of output values.

The second block of memory cells can comprise programmable resistance memory cells. The second block of memory cells can comprise charge storage memory cells. The first and second blocks of memory cells can be implemented on a single integrated circuit or multichip module under one package.

A method is also provided for operating a device that comprises a first block of memory cells to store an input array, and a second block of memory cells. The method comprises executing in-place pooling according to a function over the input array to generate an array of output values, and storing the array of output values in the second block of memory cells.

Other aspects and advantages of the present invention can be seen on review of the drawings, the detailed description and the claims, which follow.

BRIEF DESCRIPTION OF THE DRAWINGS

FIGS. 10A, 10B and 10C illustrate example pulse shapes of set pulses for changing the resistance level of a cell having a body of phase change material.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
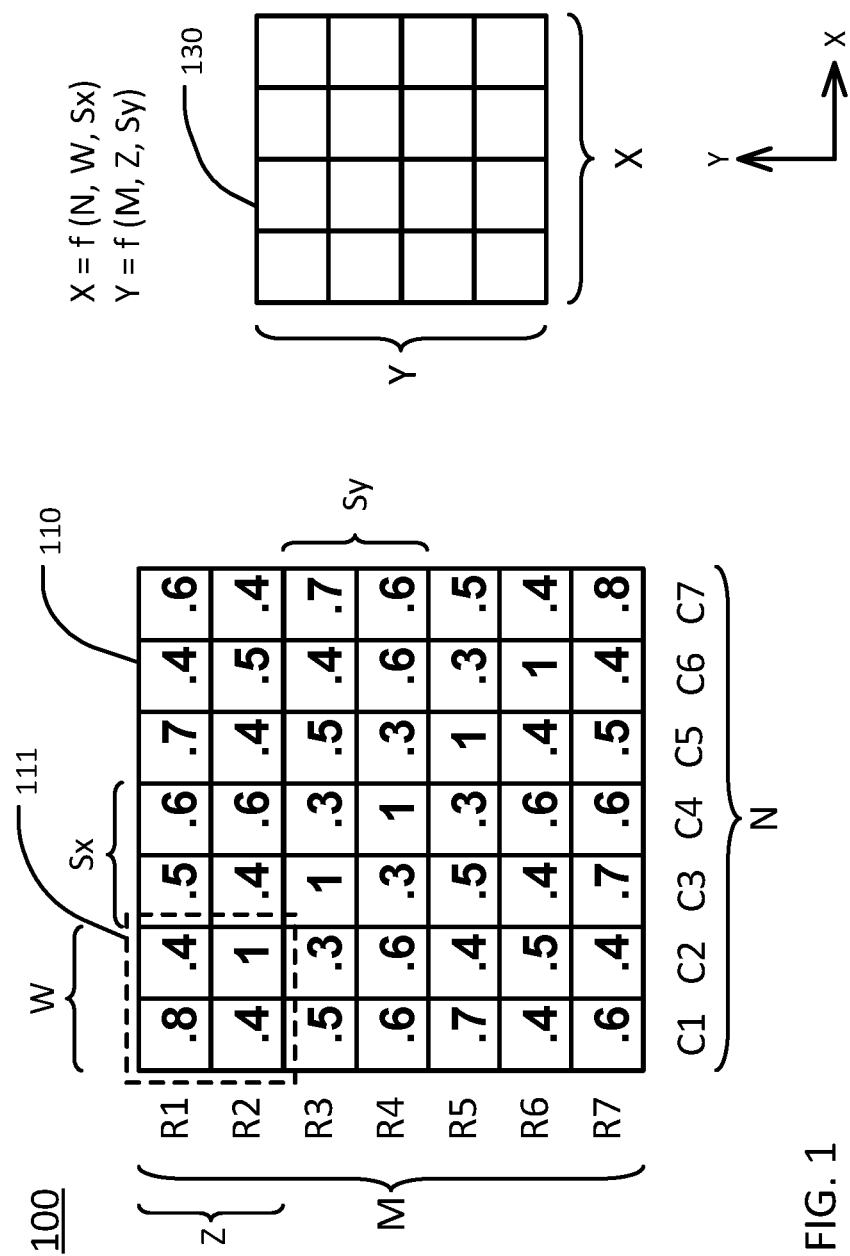
FIG. 1 illustrates an example device comprising a first block of memory cells to store an input array, and a second block of memory cells.

FIG. 1 illustrates an example device 100 comprising a first block of memory cells 110 to store an input array and a second block of memory cells 130 to store an output array. The device includes pooling circuitry (1140, FIG. 11) operatively coupled to the first block of memory cells to execute in-place pooling according to a function over the input array to generate an array of output values. The device includes writing circuitry (1150, FIG. 11) operatively coupled to the second block to store the array of output values in the second block of memory cells. In one embodiment, the first block of memory cells and the second block of memory cells can be implemented on a single integrated circuit chip or a multi-chip module under one package.

The first block of memory cells 110 to store the input array can have a number M of rows of cells and a number N of columns of cells. Analog values shown for a cell in the first block of memory cells can represent resistance values, such as 0.8 MΩ, 0.4 MΩ, 0.5 MΩ, etc. (Mega Ohm), or threshold voltage values, such as 8V, 4V, 5V, etc.

A frame of cells (e.g. 111) in the first block of memory cells can have a number Z of rows and a number W of columns. The first block of memory cells can include a set of frame of cells. A second frame of cells in the set of frame of cells can be sequenced from a first frame of cells in the set of frame of cells by a first stride Sx including at least one column in a row direction (X-direction) or by a second stride Sy including at least one row in a column direction (Y-direction).

The second block of memory cells 130 can have a number Y of rows and a number X of columns. The number Y is a function of the number M of rows of cells in the first block of memory cells, the number Z of rows of cells in a frame of memory cells in the first block of memory cells, and the second stride Sy, i.e., Y=F (M, Z, Sy). The number X is a function of the number N of columns of cells in the first block of memory cells, the number W of columns of cells in a frame of memory cells in the first block of memory cells, and the first stride Sx, i.e., X=f (N, W, Sx). For instance, if W=Sx and Z=Sy, then X=N/W and Y=M/Z, where X and Y are rounded up to the nearest integer. As shown in the example of FIG. 1, N=7, M=7, W=2, Z=2, Sx=2, Sy=2, X=4, and Y=4.

In one embodiment, the analog levels in the second block of memory cells include programmable resistance memory cells having resistance levels. Programmable resistance memories can include phase change memory (PCM), resistive random access memory (RRAM), and magnetoresistive random access memory (MRAM). A number '1', '0.5', '0.6', '0.7', '0.8', etc. for a cell in the second block of memory cells 130 can represent 1 MΩ, 0.5 MΩ, 0.6 MΩ, 0.7 MΩ, 0.8 MΩ, etc. respectively.

Before a process starts to execute in-place pooling according to a function over the input array to generate an array of output values, the second block of memory cells can be set to an upper limit for resistance levels (e.g. 1 MΩ), representing the case when the maximum analog value among cells in a frame in the set of frames in the input array is at or above the upper limit for resistance levels.

In an alternative embodiment, the analog levels in the second block of memory cells include charge storage memory cells having threshold voltage levels. Charge storage memories can include floating gate and nitride trapping memories. In this embodiment, a number '1', '0.9', '0.8', '0.7', '0.6', etc. for a cell in the second block of memory cells 130 can represent 10V, 9V, 8V, 7V, 6V, etc. respectively.

Before a process starts to execute in-place pooling according to a function over the input array to generate an array of output values, the second block of memory cells can be erased to a lower limit for threshold voltage levels (e.g. 1V), representing the case when the maximum analog value among cells in a frame in the set of frames in the input array is at or below the lower limit for threshold voltage levels.

Analog sensing circuitry (1139, FIG. 11) coupled to the first block of memory cells can generate analog values for the input array. Generating analog values for the input array can include decoding the first block of memory cells, and sensing the decoded cells in the first block of memory cells to generate analog values.

Pooling circuitry (1140, FIG. 11) can execute in-place pooling according to a function over the input array to generate an array of output values. Each output value in the array of output values can indicate the maximum analog value among the cells in a frame in the set of frames.

Writing circuitry (1150, FIG. 11) operatively coupled to the second block can store the array of output values in the second block of memory cells. Storing the output value in the particular cell in the second block of memory cells can include addressing a particular cell in the second block of memory cells, and applying a sequence of write pulses for the particular cell in the second block having a number of write pulses determined according to a corresponding output value in the array of output values. A number of write pulses can refer to a number of set pulses for a sequence of set pulses for memory cells having resistance levels, or a number of program pulses for a sequence of program pulses for memory cells having threshold voltage levels.

Storing the output value in the particular cell in the second block of memory cells can include addressing a particular cell in the second block of memory cells, and applying a sequence of write pulses for the particular cell in the second block having a pulse duration determined according to a corresponding output value in the array of output values. A pulse duration can refer to a set time of a set pulse for a sequence of set pulses for memory cells having resistance levels, or a program time of a program pulse for a sequence of program pulses for memory cells having threshold voltage levels. The set time can be applied to a sequence of set pulses so the set pulses in the sequence have the same set time. The program time can be applied to a sequence of program pulses so the program pulses in the sequence can have the same program time.

Furthermore, the output values can be converted into a combination of varying set times and numbers of set pulses for memory cells in the second block having resistance levels, or a combination of varying program times and numbers of program pulses for memory cells in the second block having threshold voltage levels.

Storing the output value in the particular cell in the second block of memory cells can include addressing a particular cell in the second block of memory cells, and applying a sequence of write pulses for the particular cell in the second block having a tail length of a write pulse determined according to a corresponding output value in the array of output values, for memory cells in the second block having resistance levels. The output values can be converted into a combination of varying set times, numbers of set pulses, and tail lengths of a write pulse for memory cells in the second block having resistance levels, The output values in the array of output values are stored as analog levels in the second block of memory cells, and no verify cycles are needed to verify that a cell in the second block of memory cells has been changed to a target resistance or threshold range. In comparison, to write a digital value to a cell, verify cycles are needed to verify whether the cell is within a target resistance or threshold range, and to determine whether more set pulses or program pulses are needed. Storing output values as analog levels instead of digital values can improve the performance of storing the output values in the array of output values, because the verify cycles are not needed.

FIGS. 2-7 illustrate an example of executing in-place pooling according to a function over an input array of memory cells. For a set of frames of cells in the input array, in some embodiments, a function can determine a maximum analog value among cells in each frame in the set of frames to generate the array of output values, where each output value in the array of output values corresponds to a frame in the set of frames, and indicates the maximum analog value among the cells in the frame in the set of frames. In an alternative embodiment, the function can determine an average analog value among cells in each frame in the set of frames to generate the array of output values, and each output value in the array of output values indicates the average analog value among the cells in the frame in the set of frames. In yet another alternative embodiment, the function can determine a sum of analog values among cells in each frame in the set of frames to generate the array of output values, and each output value in the array of output values indicates the sum of analog values among the cells in the frame in the set of frames. Address generation circuits can apply addresses for the set of frames to the first block in coordination with the pooling circuitry.

The input array 110 includes rows of cells from an upper row R1 to a lower row R7, and columns of cells from a left column C1 to a right column C7. In the example, the set of frames of cells is sequenced from a first frame including a memory cell in the upper row R1 and the left column C1 (R1C1) of the input array, to a last frame including a memory cell including a memory cell in the lower row R7 and the right column C7 (R7C7) of the input array.

Figure 2:
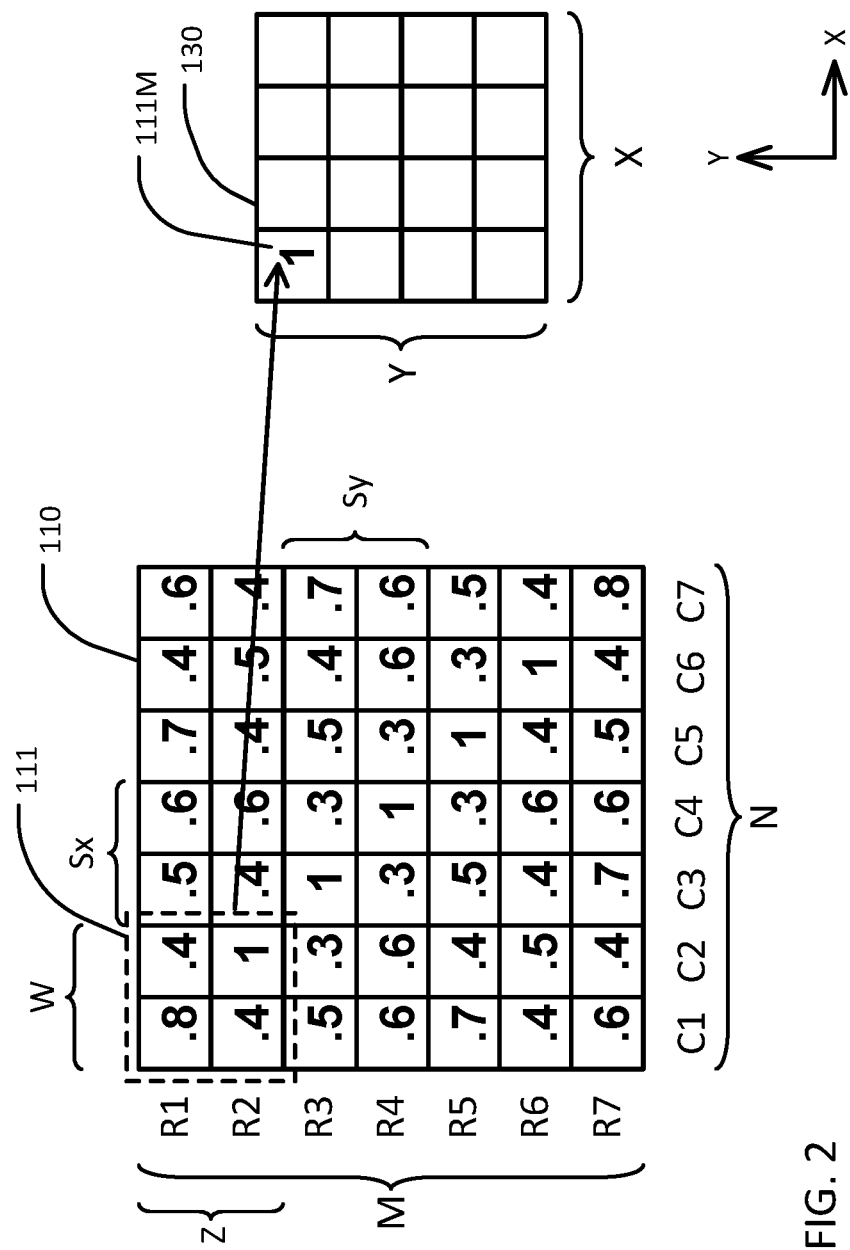
FIG. 2 illustrates an example of executing in-place pooling according to a function over an input array.

FIG. 2 illustrates an example of executing in-place pooling according to a function over an input array. In this example, a function can determine a maximum analog value among cells in a first frame 111 in the set of frames in the first block of memory cells 110 to generate an output value in the array of output values. The first frame 111 includes analog values 0.8 MΩ, 0.4 MΩ, 0.4 MΩ and 1 MΩ in cells at respective row/column addresses R1C1, R1C2, R2C1 and R2C2, so a maximum analog value among cells in the first frame 111 is 1 MΩ. The output value (e.g. 1 MΩ) in the array of output values corresponds to the first frame 111, and indicates the maximum analog value among the cells in the first frame 111.

Writing circuitry (1150, FIG. 11) can change an analog level of a first cell 111M in the second block of memory cells 130 according to the maximum analog value among cells in the first frame 111 in the first block of memory cells 110.

Figure 3:
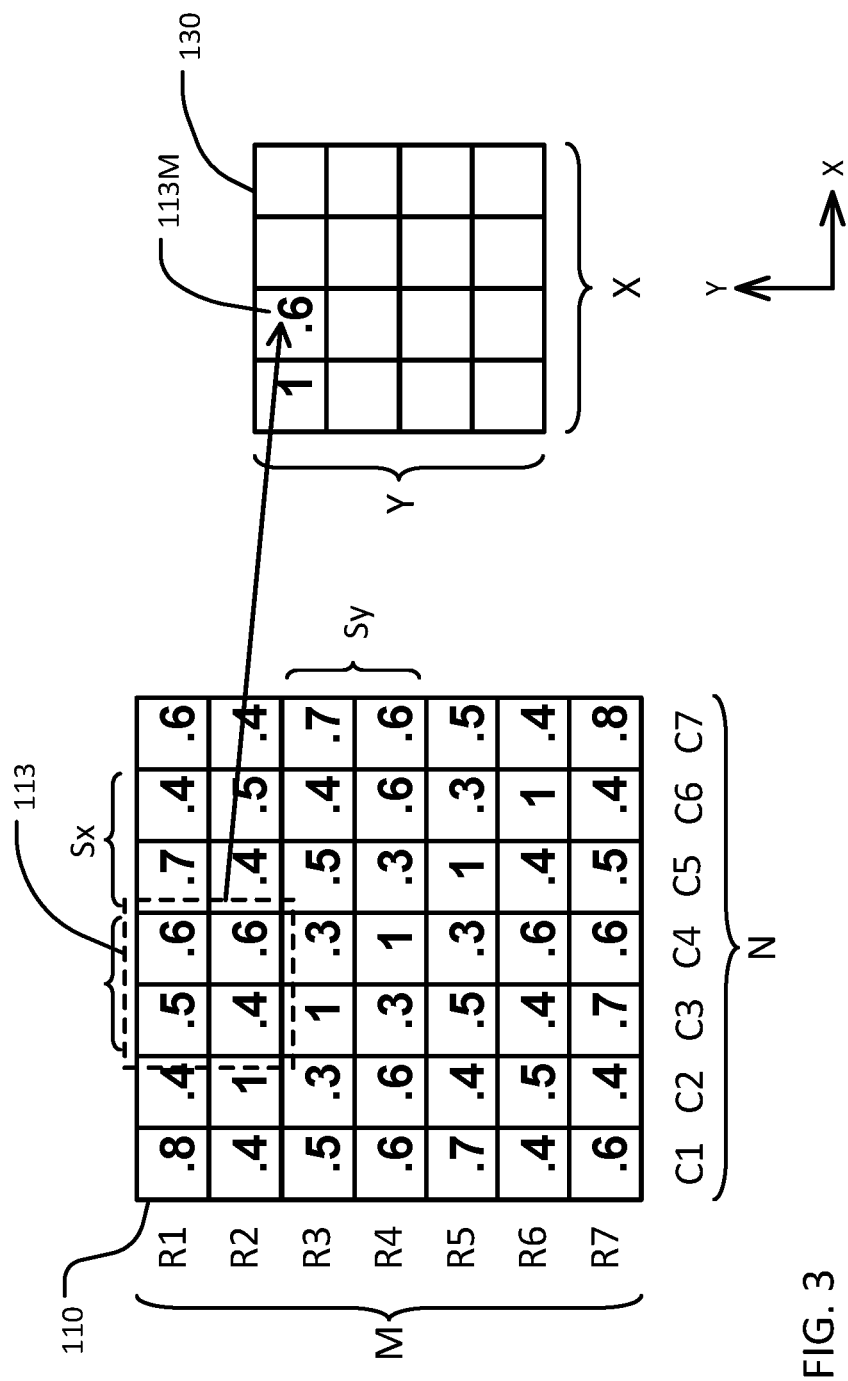
FIG. 3 illustrates a second example of executing in-place pooling according to a function over an input array.

FIG. 3 illustrates a second example of executing in-place pooling according to a function over an input array. In this example, a function can determine a maximum analog value among cells in a second frame 113 in the set of frames in the first block of memory cells 110 to generate a second output value in the array of output values. The second frame 113 is sequenced from the first frame 111 by a first stride Sx including two columns in a row direction (X-direction). The second frame 113 includes analog values 0.5 MΩ, 0.6 MΩ, 0.4 MΩ and 0.6 MΩ in cells at respective row/column addresses R1C3, R1C4, R2C3 and R2C4, so a maximum analog value among cells in the second frame 113 is 0.6 MΩ. The output value (e.g. 0.6 MΩ) in the array of output values corresponds to the second frame 113, and indicates the maximum analog value among the cells in the second frame 113.

Writing circuitry (1150, FIG. 11) can change an analog level of a second cell 113M in the second block of memory cells 130 according to the maximum analog value among cells in the frame 113 in the first block of memory cells 110.

Figure 4:
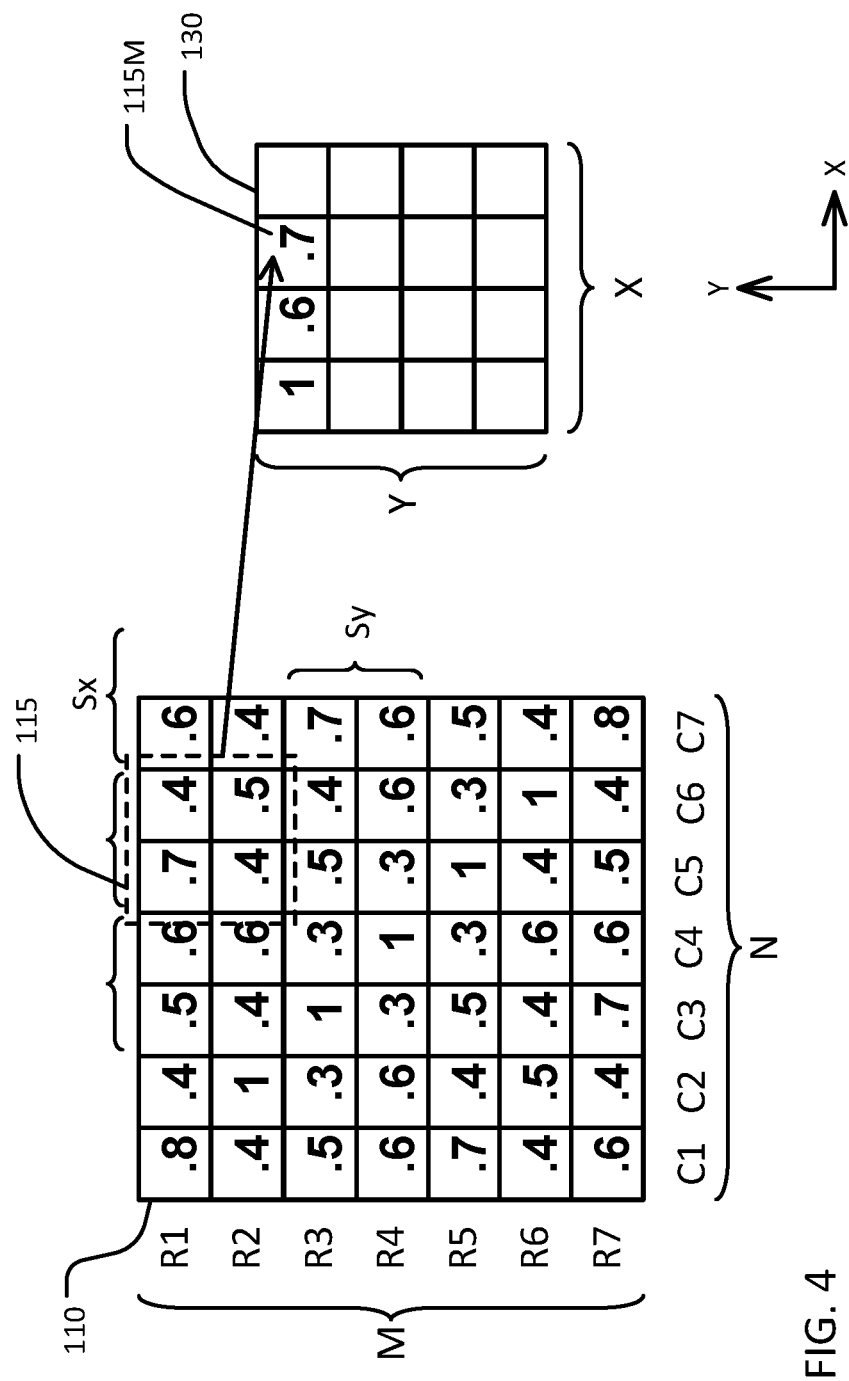
FIG. 4 illustrates a third example of executing in-place pooling according to a function over an input array.

FIG. 4 illustrates a third example of executing in-place pooling according to a function over an input array. In this example, a function can determine a maximum analog value among cells in a third frame 115 in the set of frames in the first block of memory cells 110 to generate a third output value in the array of output values. The third frame 115 is sequenced from the second frame 113 (FIG. 3) by the first stride Sx including two columns in a row direction (X-direction).

The third frame 115 includes analog values 0.7 MΩ, 0.4 MΩ, 0.4 MΩ and 0.5 MΩ in cells at respective row/column addresses R1C5, R1C6, R2C5 and R2C6, so a maximum analog value among cells in the third frame 115 is 0.7 MΩ. The output value 0.7 MΩ in the array of output values corresponds to the third frame 115, and indicates the maximum analog value among the cells in the third frame 115.

Writing circuitry (1150, FIG. 11) can change an analog level of a third cell 115M in the second block of memory cells 130 according to the maximum analog value among cells in the third frame 115 in the first block of memory cells 110.

Figure 5:
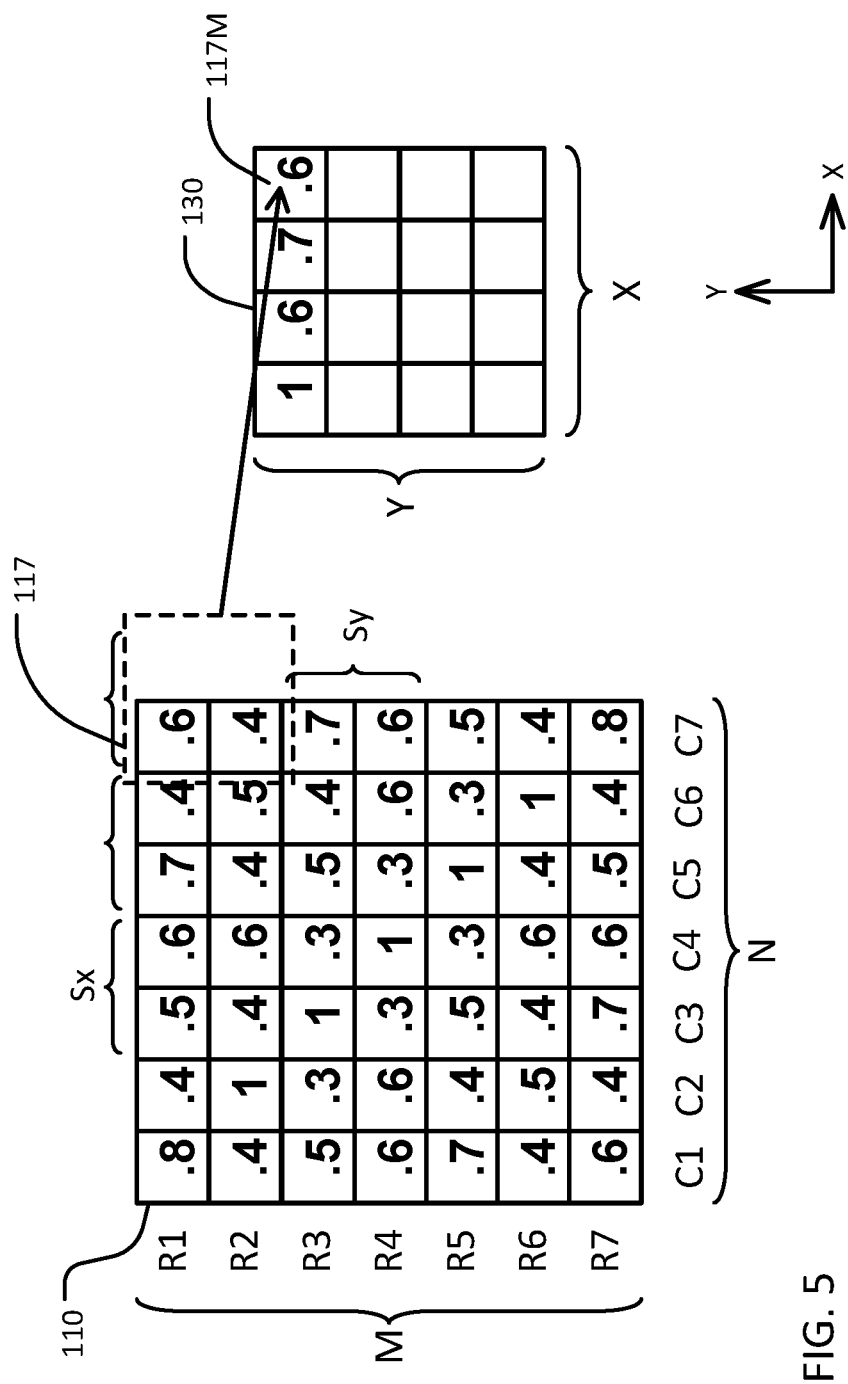
FIG. 5 illustrates a fourth example of executing in-place pooling according to a function over an input array.

FIG. 5 illustrates a fourth example of executing in-place pooling according to a function over an input array. In this example, a function can determine a maximum analog value among cells in a fourth frame 117 in the set of frames in the first block of memory cells 110 to generate a fourth output value in the array of output values. The fourth frame 117 is sequenced from the third frame 115 (FIG. 4) by the first stride Sx including two columns in a row direction (X-direction). In this example, the fourth frame 117 includes cells in the one last column (e.g. C7) on the right side of the first block of memory cells 110, instead of cells in two columns of the first block of memory cells 110 for the first, second, and third frames.

The fourth frame 117 includes analog values 0.6 MΩ and 0.4 MΩ in cells at respective row/column addresses R1C7 and R2C7, so a maximum analog value among cells in the fourth frame 117 is 0.6 MΩ. The output value 0.6 MΩ in the array of output values corresponds to the fourth frame 117, and indicates the maximum analog value among the cells in the fourth frame 117.

Writing circuitry (1150, FIG. 11) can change an analog level of a fourth cell 117M in the second block of memory cells 130 according to the maximum analog value among cells in the fourth frame 117 in the first block of memory cells 110.

Figure 6:
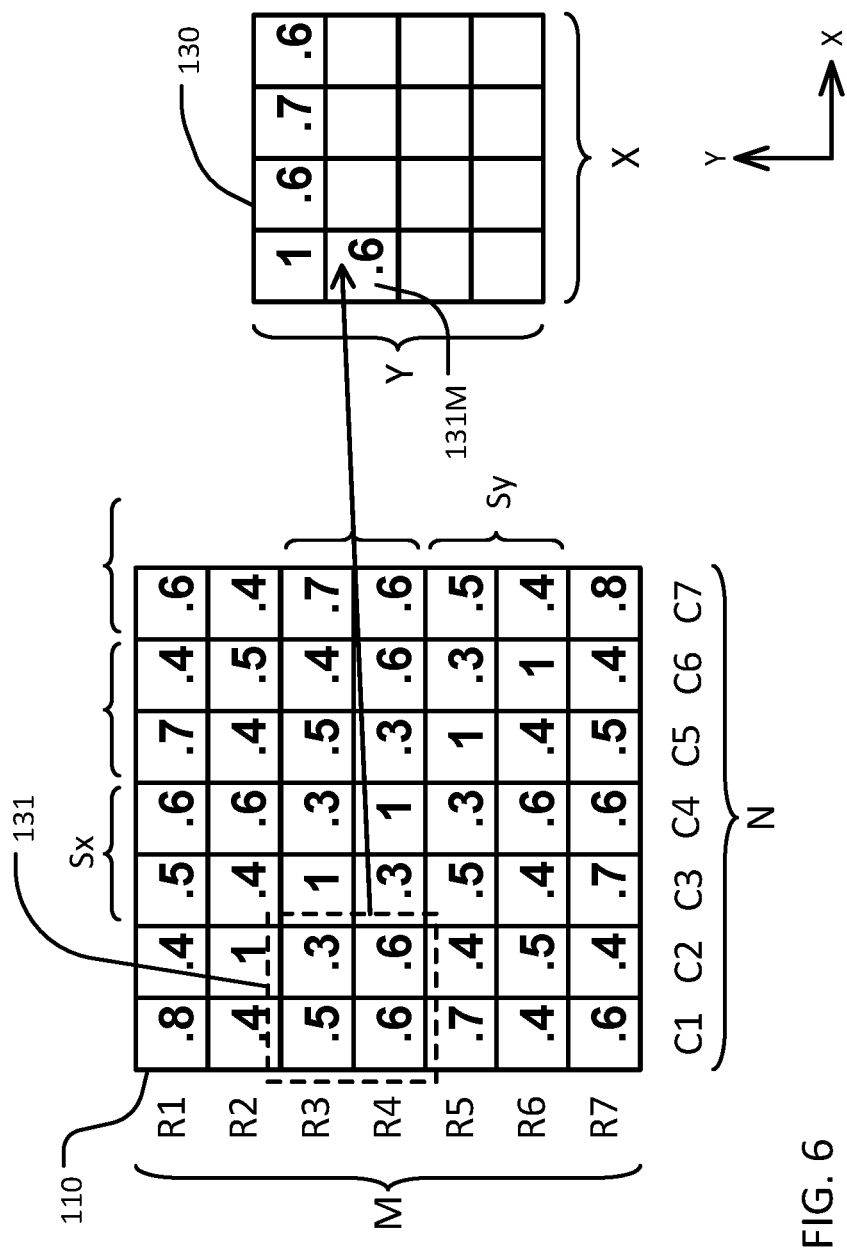
FIG. 6 illustrates a fifth example of executing in-place pooling according to a function over an input array.

FIG. 6 illustrates a fifth example of executing in-place pooling according to a function over an input array. In this example, a function can determine a maximum analog value among cells in a fifth frame 131 in the set of frames in the first block of memory cells 110 to generate a fifth output value in the array of output values. The fifth frame 131 is sequenced from the first frame 111 (FIG. 2) by the second stride Sy including two rows in a column direction (Y-direction).

The fifth frame 131 includes analog values 0.5 MΩ, 0.3 MΩ, 0.6 MΩ and 0.6 MΩ in cells at respective row/column addresses R3C1, R3C2, R4C1 and R4C2, so a maximum analog value among cells in the fifth frame 131 is 0.6 MΩ. The output value 0.6 MΩ in the array of output values corresponds to the fifth frame 131, and indicates the maximum analog value among the cells in the fifth frame 131.

Writing circuitry (1150, FIG. 11) can change an analog level of a fifth cell 131M in the second block of memory cells 130 according to the maximum analog value among cells in the fifth frame 131 in the first block of memory cells 110.

Figure 7:
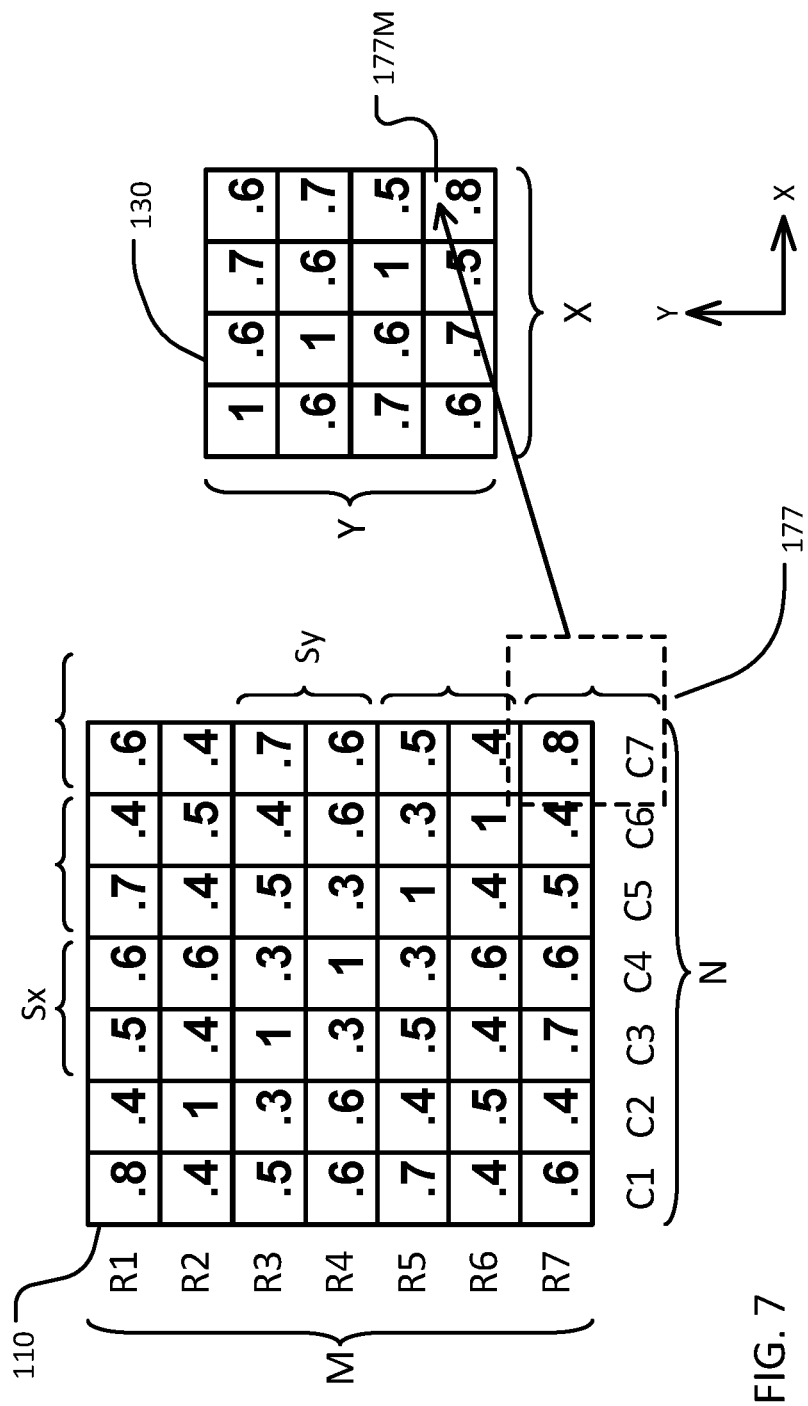
FIG. 7 illustrates a sixth example of executing in-place pooling according to a function over an input array.

FIG. 7 illustrates a sixth example of executing in-place pooling according to a function over an input array. In this example, a function can determine a maximum analog value among cells in a last frame 177 in the set of frames in the first block of memory cells 110 to generate a last output value in the array of output values. The last frame 177 is sequenced from the first frame 111 (FIG. 2) by the first stride Sx including two columns in a row direction (Y-direction) multiple times, and by the second stride Sy including two rows in a column direction (Y-direction) multiple times, until the last frame 177 includes a cell (e.g. R7C7) in the last column (e.g. C7) on the right side of the first block of memory cells 110 and in the last row (e.g. R7) on the lower side of the first block of memory cells 110.

The last frame 177 includes an analog value 0.8 MΩ in a cell at a row/column address R7C7, so a maximum analog value among cells in the sixth frame 177 is 0.6 MΩ. The output value 0.6 MΩ in the array of output values corresponds to the last frame 177, and indicates the maximum analog value among the cells in the last frame 177.

Writing circuitry (1150, FIG. 11) can change an analog level of a last cell 177M in the second block of memory cells 130 according to the maximum analog value among cells in the last frame 177 in the first block of memory cells 110.

Figure 7A:
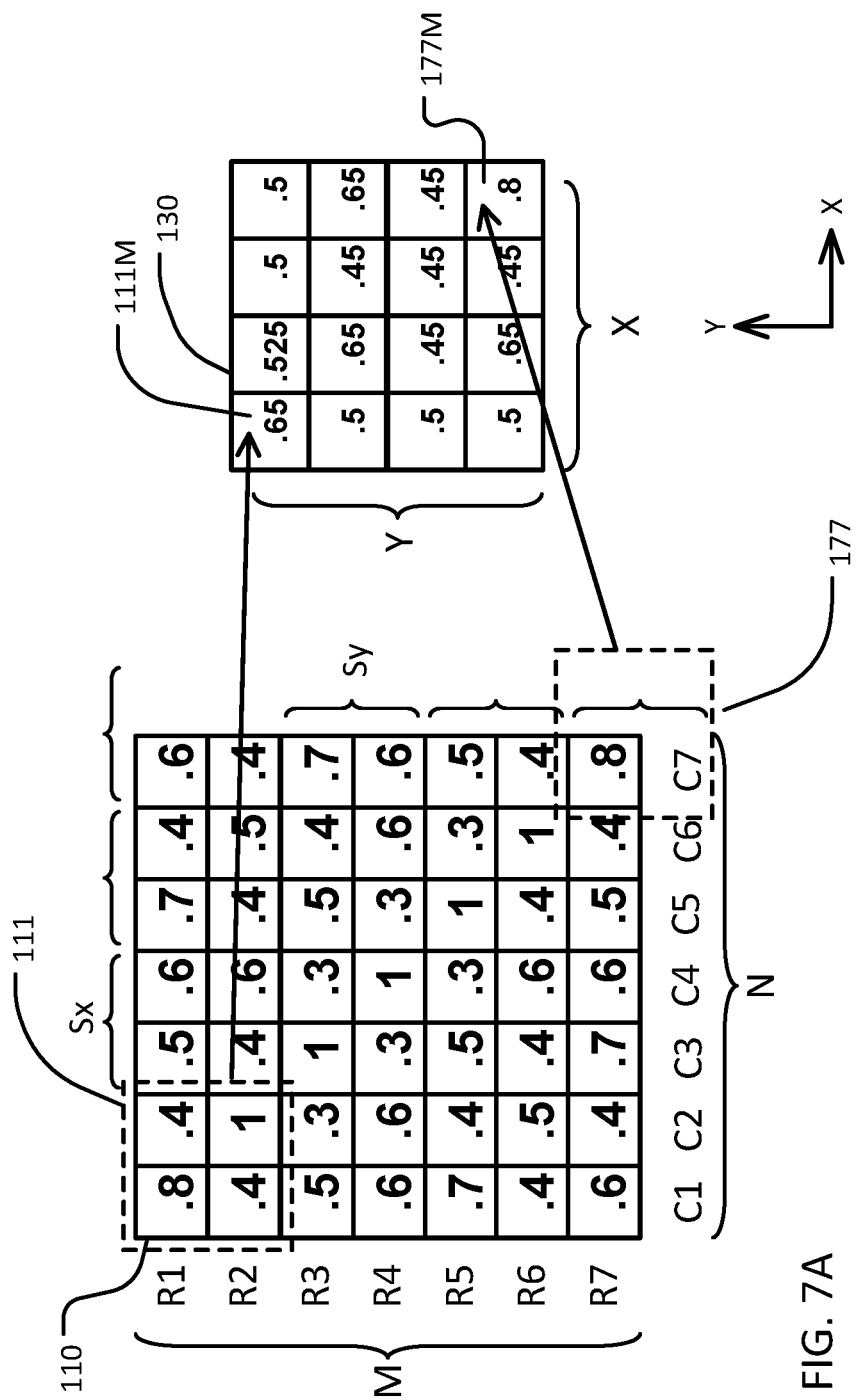
FIG. 7A illustrates a seventh example of executing in-place pooling according to a function over an input array, where the function can determine an average analog value.

FIG. 7A illustrates a seventh example of executing in-place pooling according to a function over an input array, where the function can determine an average analog value. In this example, a function can determine an average analog value among cells in a first frame 111 in the set of frames in the first block of memory cells 110 to generate an output value in the array of output values. The first frame 111 includes analog values 0.8 MΩ, 0.4 MΩ, 0.4 MΩ and 1 MΩ in cells at respective row/column addresses R1C1, R1C2, R2C1 and R2C2, so an average analog value among cells in the first frame 111 is 0.65 MΩ. The output value (e.g. 0.65 MΩ) in the array of output values corresponds to the first frame 111, and indicates the average analog value among the cells in the first frame 111. Writing circuitry (1150, FIG. 11) can change an analog level of a first cell 111M in the second block of memory cells 130 according to the average analog value among cells in the first frame 111 in the first block of memory cells 110.

In this example, a function can determine an average analog value among cells in a last frame 177 in the set of frames in the first block of memory cells 110 to generate a last output value in the array of output values. The last frame 177 is sequenced from the first frame 111 (FIG. 2) by the first stride Sx including two columns in a row direction (Y-direction) multiple times, and by the second stride Sy including two rows in a column direction (Y-direction) multiple times, until the last frame 177 includes a cell (e.g. R7C7) in the last column (e.g. C7) on the right side of the first block of memory cells 110 and in the last row (e.g. R7) on the lower side of the first block of memory cells 110.

The last frame 177 includes an analog value 0.8 MΩ in a cell at a row/column address R7C7, so an average analog value among cells in the sixth frame 177 is 0.8 MΩ. The output value 0.6 MΩ in the array of output values corresponds to the last frame 177, and indicates the average analog value among the cells in the last frame 177.

Writing circuitry (1150, FIG. 11) can change an analog level of a last cell 177M in the second block of memory cells 130 according to the average analog value among cells in the last frame 177 in the first block of memory cells 110.

Figure 7B:
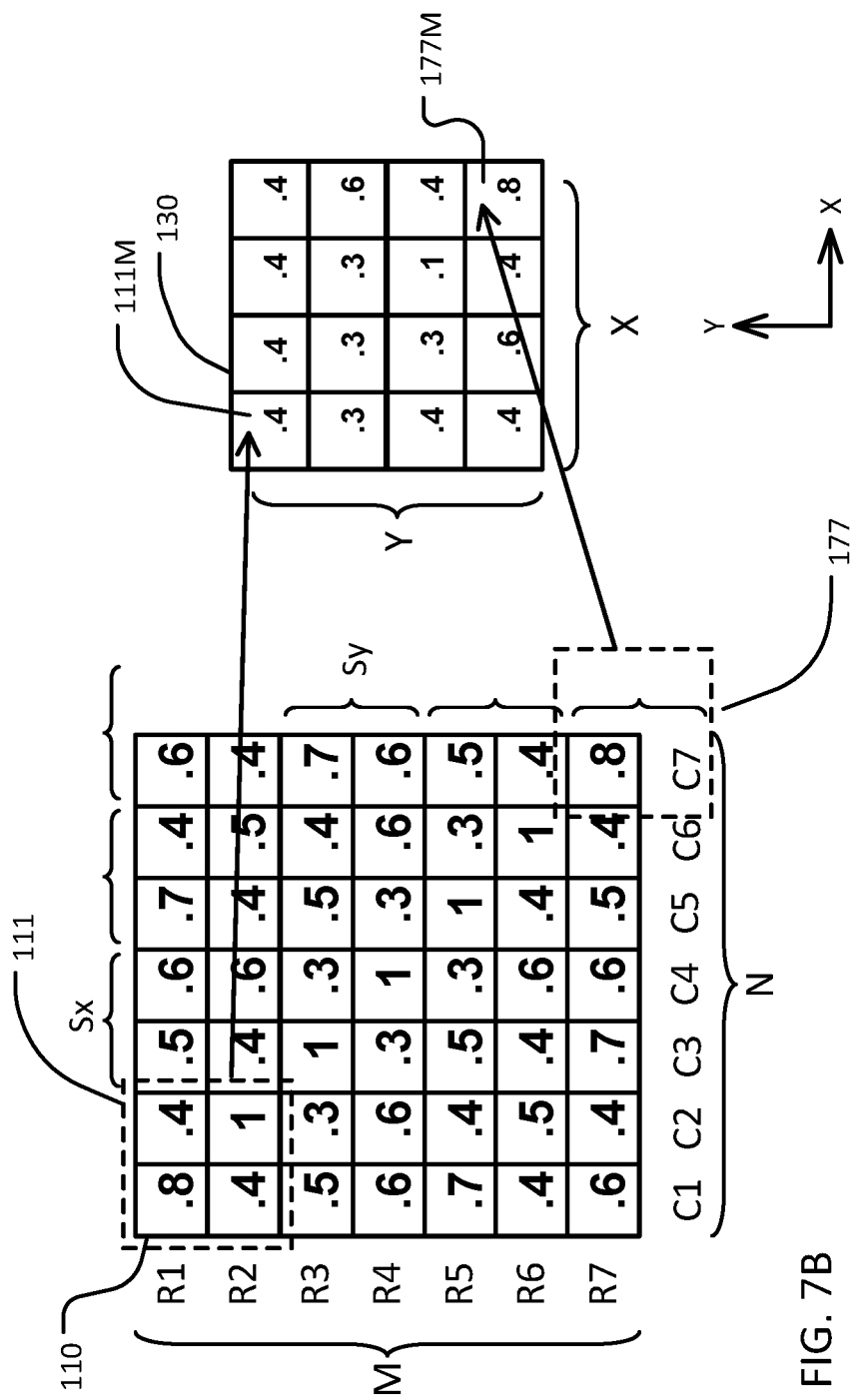
FIG. 7B illustrates an eighth example of executing in-place pooling according to a function over an input array, where the function can determine a minimum analog value.

FIG. 7B illustrates an eighth example of executing in-place pooling according to a function over an input array, where the function can determine a minimum analog value. In this example, a function can determine a minimum analog value among cells in a first frame 111 in the set of frames in the first block of memory cells 110 to generate an output value in the array of output values. The first frame 111 includes analog values 0.8 MΩ, 0.4 MΩ, 0.4 MΩ and 1 MΩ in cells at respective row/column addresses R1C1, R1C2, R2C1 and R2C2, so a minimum analog value among cells in the first frame 111 is 0.4 MΩ. The output value (e.g. 0.4 MΩ) in the array of output values corresponds to the first frame 111, and indicates the minimum analog value among the cells in the first frame 111. Writing circuitry (1150, FIG. 11) can change an analog level of a first cell 111M in the second block of memory cells 130 according to the minimum analog value among cells in the first frame 111 in the first block of memory cells 110.

In this example, a function can determine a minimum analog value among cells in a last frame 177 in the set of frames in the first block of memory cells 110 to generate a last output value in the array of output values. The last frame 177 is sequenced from the first frame 111 (FIG. 2) by the first stride Sx including two columns in a row direction (Y-direction) multiple times, and by the second stride Sy including two rows in a column direction (Y-direction) multiple times, until the last frame 177 includes a cell (e.g. R7C7) in the last column (e.g. C7) on the right side of the first block of memory cells 110 and in the last row (e.g. R7) on the lower side of the first block of memory cells 110.

The last frame 177 includes an analog value 0.8 MΩ in a cell at a row/column address R7C7, so a minimum analog value among cells in the sixth frame 177 is 0.8 MΩ. The output value 0.8 MΩ in the array of output values corresponds to the last frame 177, and indicates the minimum analog value among the cells in the last frame 177.

Writing circuitry (1150, FIG. 11) can change an analog level of a last cell 177M in the second block of memory cells 130 according to the minimum analog value among cells in the last frame 177 in the first block of memory cells 110.

Figure 8:
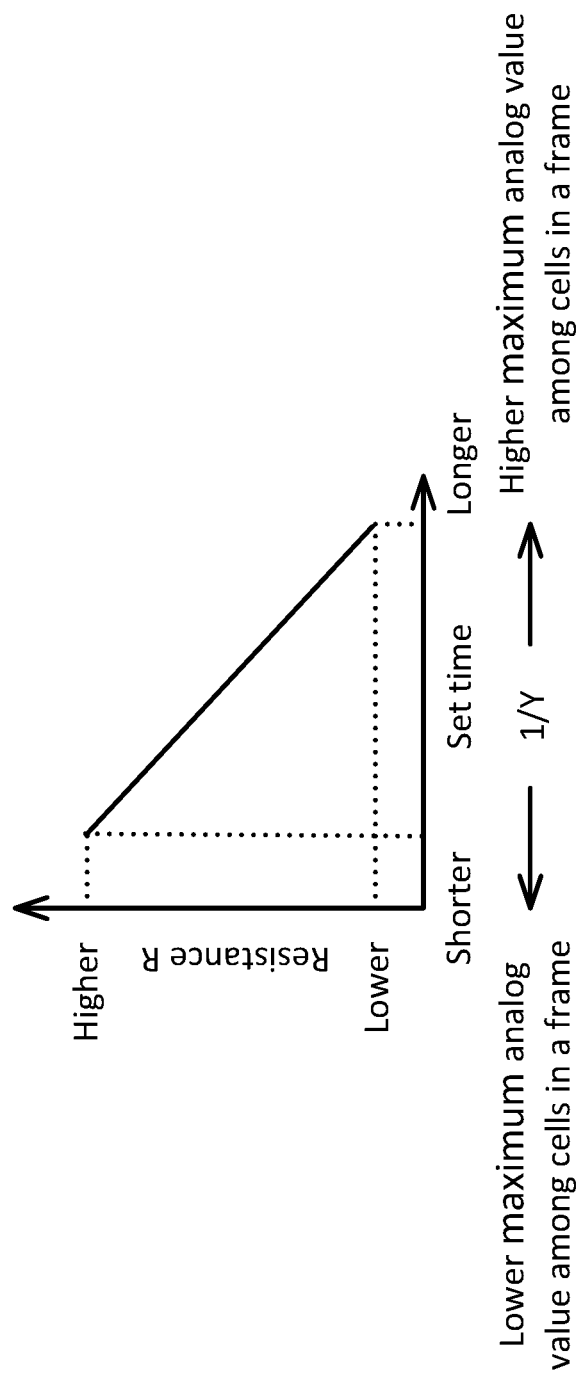
FIG. 8 illustrates an example of a pulse duration determined according to an output value from in-place pooling, where the second block of memory cells include programmable resistance memory cells.

FIG. 8 illustrates an example of a pulse duration determined according to an output value from in-place pooling, where the second block of memory cells include programmable resistance memory cells having resistance levels. Programmable resistance memories can include phase change memory (PCM), resistive random access memory (RRAM), and magnetoresistive random access memory (MRAM). For programmable resistance memory cells having resistance levels, a pulse duration can be referred to as a set time, and a write pulse can be referred to as a set pulse. The writing circuitry (e.g. 1150, FIG. 11) can determine a pulse duration for write pulses in a sequence of write pulses for changing the resistance levels of cells in the second block of memory cells according to a maximum analog value among cells in each frame in the set of frames in the input array. For instance, the set time of a set pulse can be longer for a lower maximum analog value among cells in a frame than for a higher maximum analog value among cells in a frame, or vice versa. A longer set time of a set pulse can induce lower resistance R, and a shorter set time of a set pulse can induce higher resistance R.

The writing circuitry (e.g. 1150, FIG. 11) can also determine a number of write pulses for changing the resistance levels according to a maximum analog value among cells in each frame in the set of frames in the input array. For instance, a number of write pulses can be greater for a higher maximum analog value among cells in a frame than for a lower maximum analog value among cells in a frame, or vice versa.

Before a process starts to execute in-place pooling according to a function over the input array to generate an array of output values, the second block of memory cells can be set to an upper limit for resistance levels (e.g. 1 MΩ), representing the case when the maximum analog value among cells in a frame in the set of frames in the input array is at or above the upper limit for resistance levels. During the process to execute in-place pooling, if the maximum analog value among cells in a frame in the set of frames in the input array is at or above the upper limit for resistance levels, then no set pulse is applied to a cell in the second block of memory cells.

Figure 9:
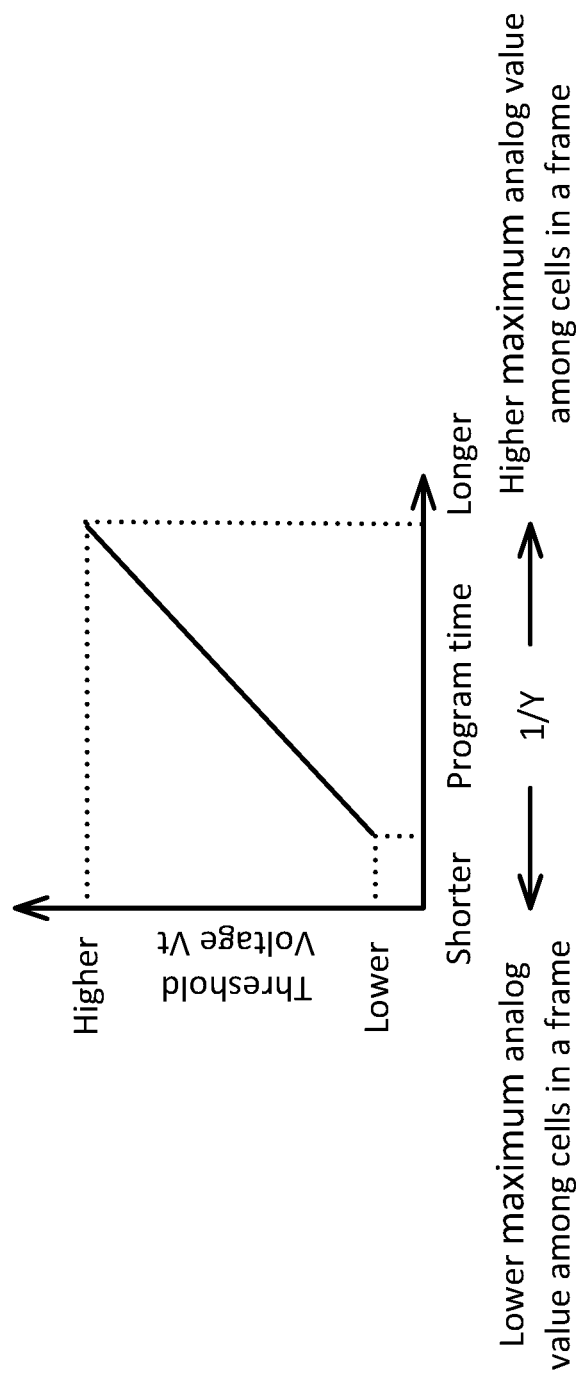
FIG. 9 illustrates an example of a pulse duration determined according to an output value from in-place pooling, where the second block of memory cells include charge storage memory cells.

FIG. 9 illustrates an example of a pulse duration determined according to an output value from in-place pooling, where the second block of memory cells include charge storage memory cells having threshold voltage levels. Charge storage memories can include floating gate and nitride trapping memories. For charge storage memory cells, a pulse duration can be referred to as a program time, and a write pulse can be referred to as a program pulse. The writing circuitry (e.g. 1150, FIG. 11) can determine a pulse duration for write pulses in a sequence of write pulses for changing the threshold voltage levels in the second block of memory cells according to a maximum analog value among cells in each frame in the set of frames in the input array. For instance, the program time of a program pulse can be longer for a lower maximum analog value among cells in a frame than for a higher maximum analog value among cells in a frame, or vice versa. A longer program time of a program pulse can induce higher threshold voltage Vt, and a shorter program time of a program pulse can induce lower threshold voltage Vt.

The writing circuitry (e.g. 1150, FIG. 11) can also determine a number of write pulses for changing the threshold voltage levels according to a maximum analog value among cells in each frame in the set of frames in the input array. For instance, a number of program pulses can be greater for a higher maximum analog value among cells in a frame than for a lower maximum analog value among cells in a frame, or vice versa.

Before a process starts to execute in-place pooling according to a function over the input array to generate an array of output values, the second block of memory cells can be erased to a lower limit for threshold voltage levels (e.g. 1V), representing the case when the maximum analog value among cells in a frame in the set of frames in the input array is at or below the lower limit for threshold voltage levels. During the process to execute in-place pooling, if the maximum analog value among cells in a frame in the set of frames in the input array is at or below the lower limit for threshold voltage levels, then no program pulse is applied to a cell in the second block of memory cells.

FIGS. 10A, 10B and 10C illustrate example pulse shapes of set pulses for changing the resistance level of a cell having a body of phase change material. FIG. 10A illustrates a single set pulse 1010 having a relatively long pulse duration and rapid rising and falling edges, with an amplitude above a melting threshold 1005 for the phase change material. FIG. 10B illustrates a sequence of set pulses 1021 and 1022 having a shorter pulse duration than the single set pulse 1010 in FIG. 10A. FIG. 10C illustrates a single set pulse with a rapid rising edge and a ramp-shaped trailing edge or a set tail 1035 of constant or near constant slope. For instance, a tail length of a set tail 1035 can vary between 10 ns and 1 ms, according to a corresponding output value in the array of output values.

The writing circuitry (e.g. 1150, FIG. 11) can apply a sequence of write pulses for each cell in the second block having a number of write pulses determined according to a corresponding output value in the array of output values. The writing circuitry can apply a sequence of write pulses for each cell in the second block having a pulse duration determined according to a corresponding output value in the array of output values. The writing circuitry can apply a sequence of write pulses for each cell in the second block having a tail length of a write pulse determined according to a corresponding output value in the array of output values. For programmable resistance memory cells having resistance levels, a pulse duration can be referred to as a set time, and a write pulse can be referred to as a set pulse.

Figure 11:
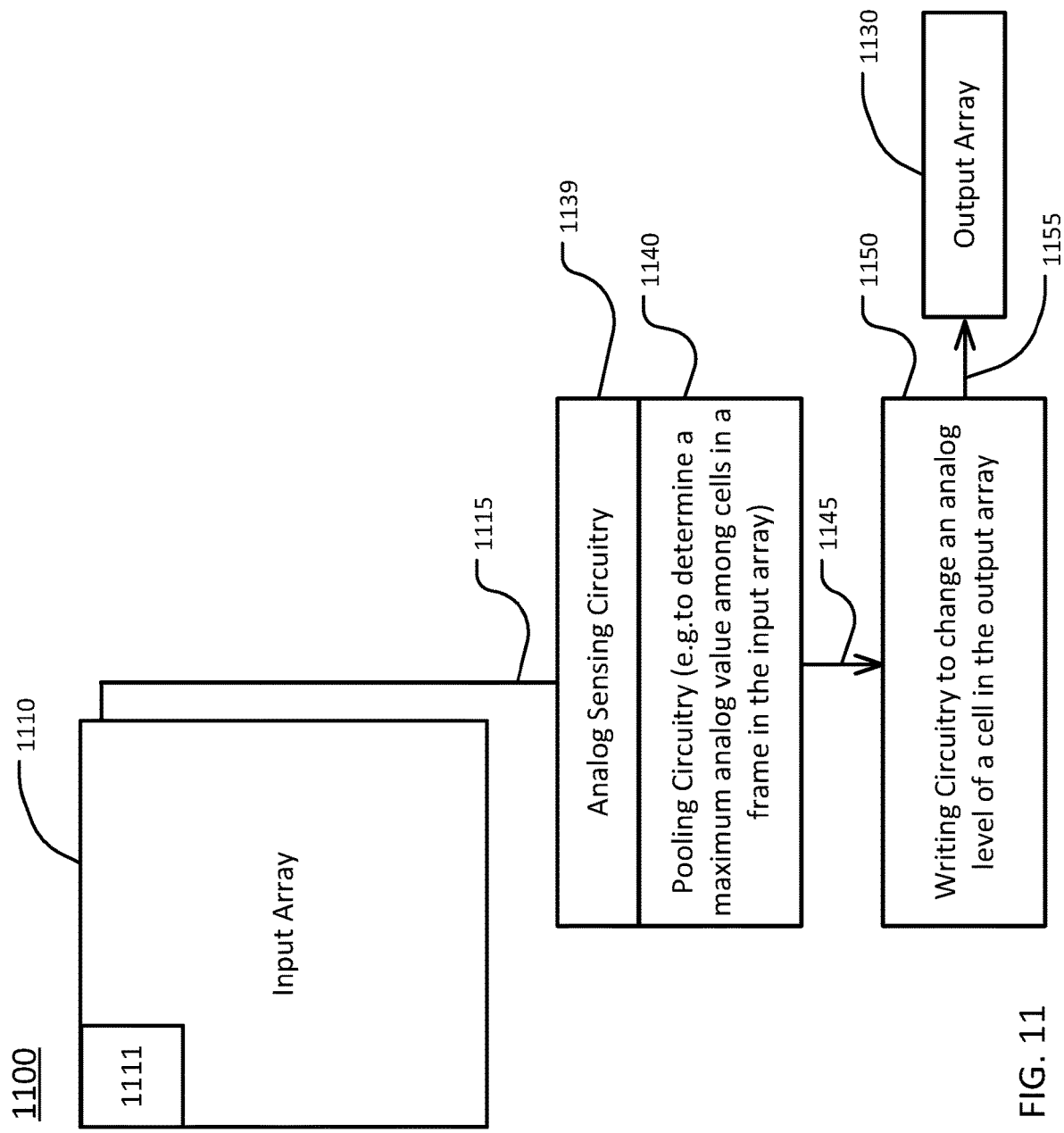
FIG. 11 illustrates an example device for executing in-place pooling according to a function over an input array to generate an array of output values, where analog sensing circuitry is coupled to a first block of memory cells to store the input array.

FIG. 11 illustrates an example device 1100 for executing in-place pooling according to a function over an input array to generate an array of output values, where analog sensing circuitry 1139 is coupled to a first block of memory cells 1110 to store the input array. The first block of memory cells 1110 has a number M of rows of cells and a number N of rows of cells. For instance, M and N can be 128.

For a set of frames of cells in the input array, the function can determine a maximum analog value among cells in each frame in the set of frames to generate the array of output values, where each output value in the array of output values corresponds to a frame in the set of frames, and indicates the maximum analog value among the cells in the frame in the set of frames.

In-place pooling according to a different function can be executed over a set of frames of cells in the input array 1110. For instance, in an alternative embodiment, the function can determine an average analog value among cells in each frame in the set of frames to generate the array of output values. In yet another alternative embodiment, the function can determine a sum of analog values among cells in each frame in the set of frames to generate the array of output values.

Pooling circuitry 1140 is operatively coupled to the first block of memory cells 1110 to execute in-place pooling according to a function over the input array to generate an array of output values, via analog sensing circuitry 1139. For instance, pooling circuitry 1140 can determine a maximum analog value among cells in each frame in the set of frames in the input array 1110. Cells in a frame of cells in the input array 1110 can be coupled to pooling circuitry 1140 via lines 1115.

Writing circuitry 1150 is operatively coupled to the second block of memory cells 1130 to store the array of output values in the second block of memory cells 1130. Writing circuitry 1150 operatively coupled to the second block is configured to store an analog level in each cell of the second block for the array of output values, for instance, according to a maximum analog value among cells in each frame in the set of frames in the input array 1110. Writing circuitry 1150 can be coupled to pooling circuitry 1140 via lines 1145, and coupled to the second block of memory cells 1130 via lines 1155.

Writing circuitry 1150 can apply a sequence of write pulses for each cell in the second block having a number of write pulses determined according to a corresponding output value in the array of output values, where the analog levels in the second block of memory cells can include resistance levels or threshold voltage levels. An output value in the array of output values can correspond to a maximum analog value among cells in a frame in the set of frames. For instance, a higher maximum analog value among cells in a frame can correspond to a greater number of write pulses than a lower maximum analog value among cells in a frame, or vice versa.

Writing circuitry 1150 can apply a sequence of write pulses for each cell in the second block having a pulse duration determined according to a corresponding output value in the array of output values, where the analog levels in the second block of memory cells can include resistance levels or threshold voltage levels. An output value in the array of output values can correspond to a maximum analog value among cells in a frame in the set of frames. For instance, a higher maximum analog value among cells in a frame can correspond to a longer pulse duration than a lower maximum analog value among cells in a frame, or vice versa.

Writing circuitry 1150 can apply a sequence of write pulses for each cell in the second block having a tail length of a write pulse determined according to a corresponding output value in the array of output values, where the analog levels in the second block of memory cells can include resistance levels. An output value in the array of output values can correspond to a maximum analog value among cells in a frame in the set of frames. For instance, a higher maximum analog value among cells in a frame can correspond to a longer tail length of a write pulse than a lower maximum analog value among cells in a frame, or vice versa.

Figure 12:
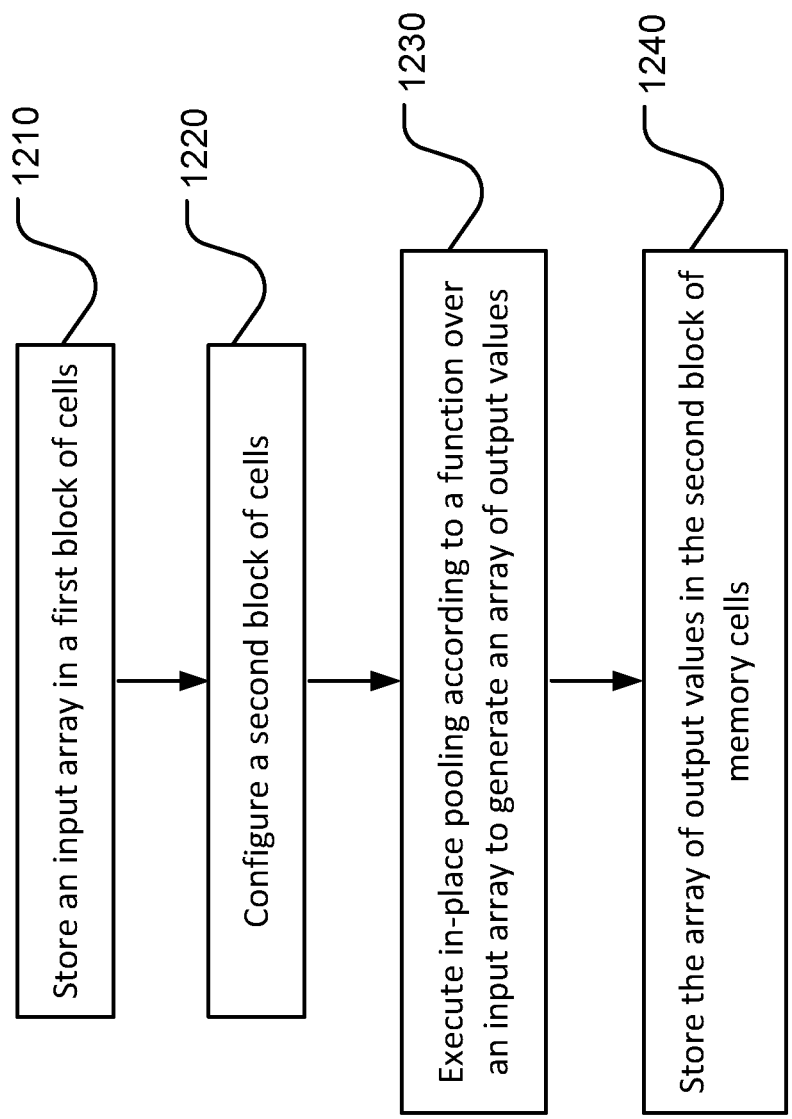
FIG. 12 illustrates a simplified flowchart for operating a device to execute in-place pooling according to a function over an input array to generate an array of output values.

FIG. 12 illustrates a simplified flowchart for operating a device to execute in-place pooling according to a function over an input array to generate an array of output values. At Step 1210, an input array can be stored in a first block of memory cells (110, FIG. 1).

At Step 1220, the second block of memory cells can be configured. As described in reference to FIG. 1, the first block of memory cells has a number M of rows of cells and a number N of columns of cells, and a frame of cells in the first block of memory cells has a number Z of rows of cells and a number W of columns of cells. The second block of memory cells can be configured to have a number Y of rows of cells and a number X of columns of cells, where the number X is a function of the number N, the number W, and the first stride Sx, and the number Y is a function of the number M, the number Z and the second stride Sy. For instance, if W=Sx and Z=Sy, then X=N/W and Y=M/Z, where X and Y are rounded up to the nearest integer. As shown in the example of FIG. 1, N=7, M=7, W=2, Z=2, Sx=2, Sy=2, X=4, and Y=4.

At Step 1220, the second block of memory cells can be initialized. The second block of memory cells can comprise programmable resistance memory cells having resistance levels, or charge storage memory cells having threshold voltage levels. Where the analog levels in the second block of memory cells include resistance levels, Step 1220 can include setting the second block of memory cells to an upper limit for resistance levels (e.g. 1 MΩ). For example, the upper limit for resistance levels can represent the case when the maximum analog value among cells in a frame in the set of frames in the input array is at or above the upper limit for resistance levels. Where the analog levels in the second block of memory cells include threshold voltage levels, Step 1220 can include erasing the second block of memory cells to a lower limit for threshold voltage levels (e.g. 1V). For example, the lower limit for threshold voltage levels can represent the case when the maximum analog value among cells in a frame in the set of frames in the input array is at or below the lower limit for threshold voltage levels. The order of Steps 1210 and 1220 as shown in the flowchart does not indicate the order in which Steps 1210 and 1220 can be executed. For instance, Step 1220 can be executed before or after Step 1210.

At Step 1230, in-place pooling can be executed according to a function over the input array to generate an array of output values. Analog sensing circuitry (1139, FIG. 11) is coupled to the first block of memory cells to generate analog values for the input array. The pooling circuitry receives the analog values as inputs to the function. For a set of frames of cells in the input array, in some embodiments, the function can determine a maximum analog value among cells in each frame in the set of frames to generate the array of output values, where each output value in the array of output values corresponds to a frame in the set of frames, and indicates the maximum analog value among the cells in the frame in the set of frames. In an alternative embodiment, the function can determine an average analog value among cells in each frame in the set of frames to generate the array of output values. In yet another alternative embodiment, the function can determine a minimum analog value among cells in each frame in the set of frames to generate the array of output values. In yet another alternative embodiment, the function can determine a sum of analog values among cells in each frame in the set of frames to generate the array of output values.

At Step 1240, the writing circuitry operatively coupled to the second block can store an analog level in each cell of the second block for the array of output values. The writing circuitry can apply a sequence of write pulses for each cell in the second block having a number of write pulses determined according to a corresponding output value in the array of output values, where cells in the second block of memory cells can include resistance levels or threshold voltage levels. The writing circuitry can apply a sequence of write pulses for each cell in the second block having a pulse duration determined according to a corresponding output value in the array of output values, where cells in the second block of memory cells can include resistance levels or threshold voltage levels. The writing circuitry can apply a sequence of write pulses for each cell in the second block having a tail length of a write pulse determined according to a corresponding output value in the array of output values, where the analog levels in the second block of memory cells can include resistance levels.

Figure 13:
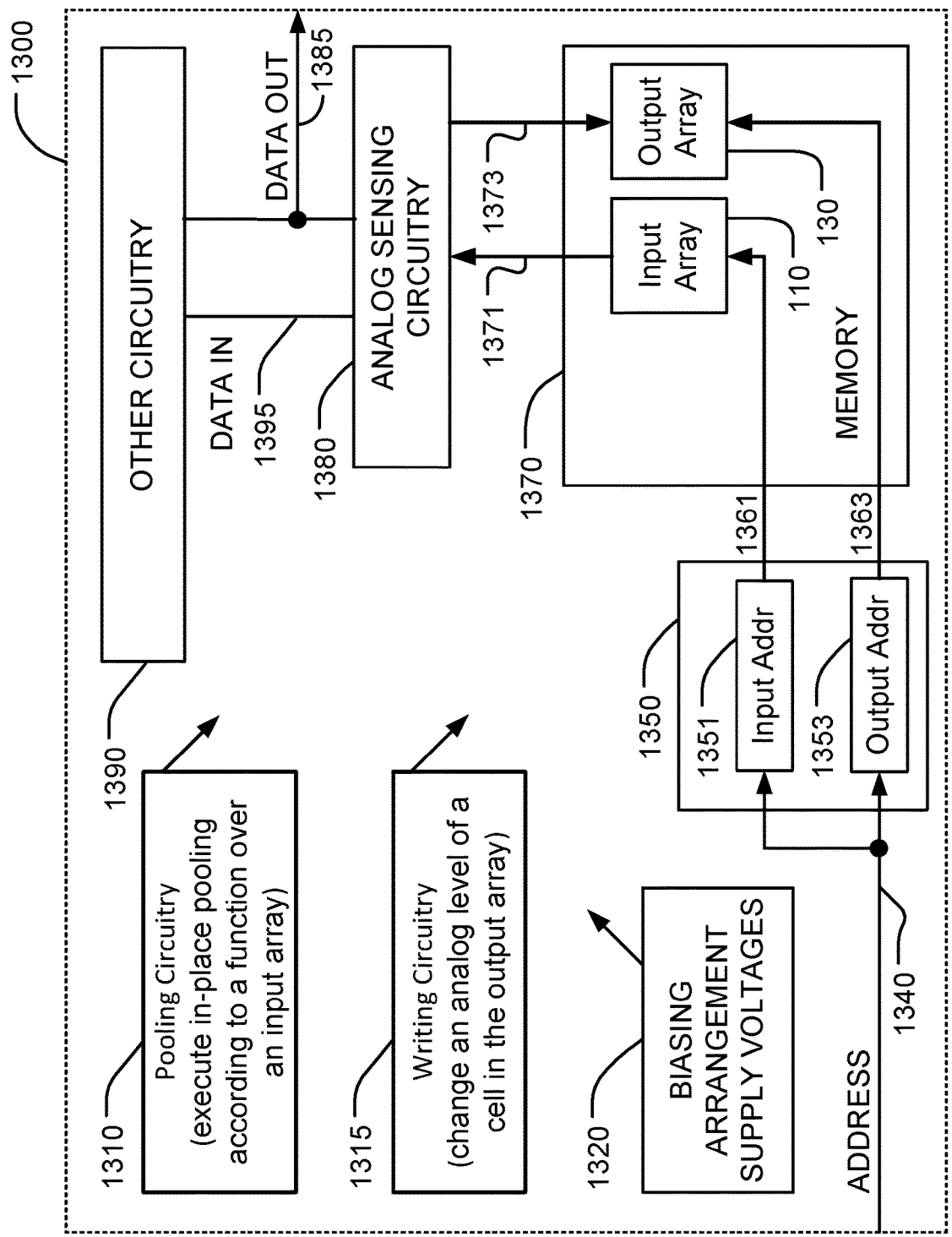
FIG. 13 is a simplified block diagram of an integrated circuit in accordance with the present technology.

FIG. 13 is a simplified block diagram of an integrated circuit in accordance with the present technology. In the example shown in FIG. 13, the integrated circuit 1300 includes a memory 1370. The memory 1370 comprises a first block of memory cells 110 to store an input array, and a second block of memory cells 130.

The integrated circuit 1300 includes address generation circuits 1350 that apply addresses for a set of frames of cells in the input array to the first block of memory cells in coordination with the pooling circuitry. Address generation circuits 1350 can include an input array address generator 1351, and an output array address generator 1353. The input array address generator 1351 is coupled to address lines 1361 which in turn are coupled to the first block of memory cells 110. The output array address generator 1353 is coupled to address lines 1363 which in turn are coupled to the second block of memory cells 130. The first block of memory cells 110 is coupled to analog sensing circuitry 1380 via lines 1371, for executing in-place pooling according to a function over the input array to generate an array of output values. The second block of memory cells 130 is coupled to the analog sensing circuitry 1380 via lines 1373, for storing the array of output values in the second block of memory cells. Addresses are supplied on bus 1340 to the input array address generator 1351, and the output array address generator 1353.

In one embodiment, the first block of memory cells 110, and the second block of memory cells 130 can be configured in separate blocks of cells, and the input array address generator 1351, and the output array address generator 1353 can be separate address generators, including respective row decoders for word lines and column decoders for bit lines. In an alternative embodiment, the first block of memory cells 110, and the second block of memory cells 130 can be configured in a common block of cells. In this embodiment, the first and second arrays of cells can share word lines coupled to a common row decoder, and have respective column decoders for bit lines coupled to respective arrays of cells. In one alternative embodiment, the first block of memory cells 110 and the second block of memory cells 130 can be configured in different blocks of cells in the same plane.

Data is supplied via the data-in line 1395 from input/ output ports on the integrated circuit 1300 or from other data sources internal or external to the integrated circuit 1300, to the first block of memory cells 110. Data supplied via the data-in line 1395 can include an input array to be stored in the first block of memory cells 110. In the illustrated embodiment, other circuitry 1390 is included on the integrated circuit, such as a general purpose processor or special purpose application circuitry, or a combination of modules providing system-on-a-chip functionality supported by the memory array. Data is supplied via the data-out line 1385 from the analog sensing circuitry 1380 to input/output ports on the integrated circuit 1300, or to other data destinations internal or external to the integrated circuit 1300. Data supplied via the data-out line 1385 can include the array of output values stored in the second block of memory cells 130.

Pooling circuitry 1310 can execute in-place pooling according to a function over the input array to generate an array of output values. Writing circuitry 1315 operatively coupled to the second block can change an analog level of a cell in the output array. Pooling circuitry 1310 and writing circuitry 1315 implemented in this example using bias arrangement state machine control the application of bias arrangement supply voltages 1320 generated or provided through the voltage supply or supplies in block 1320, such as read, program and erase voltages.

Pooling circuitry 1310 and writing circuitry 1315 can be implemented using special-purpose logic circuitry as known in the art. In alternative embodiments, pooling circuitry 1310 and writing circuitry 1315 can comprise a general-purpose processor, which can be implemented on the same integrated circuit to control the operations of the device. In yet other embodiments, a combination of special-purpose logic circuitry and a general-purpose processor can be utilized for implementation of pooling circuitry 1310 and writing circuitry 1315.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A device, comprising:
    a first block of memory cells to store an input array;
    a second block of memory cells, the first block of memory cells and the second block of memory cells being located within separate blocks of memory cells of a memory;
    pooling circuitry operatively coupled to the first block of memory cells to execute in-place pooling according to a function over the input array to generate an array of output values; and
    writing circuitry operatively coupled to the second block to store the array of output values in the second block of memory cells.

2. The device of claim 1, including
    analog sensing circuitry coupled to the first block of memory cells to generate analog values for the input array, wherein the pooling circuitry receives the analog values as inputs to the function; and
    the writing circuitry operatively coupled to the second block is configured to store an analog level in each cell of the second block for the array of output values.

3. The device of claim 1, wherein
    for a set of frames of cells in the input array, the function determines a maximum analog value among cells in each frame in the set of frames to generate the array of output values, where each output value in the array of output values corresponds to a frame in the set of frames, and indicates the maximum analog value among the cells in the frame in the set of frames.

4. The device of claim 1, wherein for a set of frames of cells in the input array, the function determines an average analog value among cells in each frame in the set of frames to generate the array of output values, where each output value in the array of output values corresponds to a frame in the set of frames, and indicates the average analog value among the cells in the frame in the set of frames.

5. The device of claim 1, wherein for a set of frames of cells in the input array, the function determines a minimum analog value among cells in each frame in the set of frames to generate the array of output values, where each output value in the array of output values corresponds to a frame in the set of frames, and indicates the minimum analog value among the cells in the frame in the set of frames.

6. The device of claim 1, including address generation circuits that apply addresses for a set of frames to the first block in coordination with the pooling circuitry.

7. The device of claim 1, wherein the writing circuitry applies a sequence of write pulses for each cell in the second block having a number of write pulses determined according to a corresponding output value in the array of output values.

8. The device of claim 1, wherein the writing circuitry applies a sequence of write pulses for each cell in the second block having a pulse duration determined according to a corresponding output value in the array of output values.

9. The device of claim 1, wherein the writing circuitry applies a sequence of write pulses for each cell in the second block having a tail length of a write pulse determined according to a corresponding output value in the array of output values.

10. The device of claim 1, wherein the second block of memory cells comprise programmable resistance memory cells.

11. The device of claim 1, wherein the second block of memory cells comprise charge storage memory cells.

12. The device of claim 1, wherein the first and second blocks of memory cells are implemented on a single integrated circuit or multichip module under one package.

13. A method of operating a device comprising a first block of memory cells to store an input array, and a second block of memory cells, the method comprising:
   executing in-place pooling according to a function over the input array to generate an array of output values; and
   storing the array of output values in the second block of memory cells,
   wherein the first block of memory cells and the second block of memory cells are located within separate blocks of memory cells of a memory.

14. The method of claim 13, wherein analog sensing circuitry is coupled to the first block of memory cells to generate analog values for the input array, the method comprising:
   receiving the analog values as inputs to the function; and
   storing an analog level in each cell of the second block for the array of output values.

15. The method of claim 13, comprising:
   for a set of frames of cells in the input array, determining a maximum analog value among cells in each frame in the set of frames to generate the array of output values, where each output value in the array of output values corresponds to a frame in the set of frames, and indicates the maximum analog value among the cells in the frame in the set of frames.

16. The method of claim 13, comprising:
   for a set of frames of cells in the input array, determining an average analog value among cells in each frame in the set of frames to generate the array of output values, where each output value in the array of output values corresponds to a frame in the set of frames, and indicates the average analog value among the cells in the frame in the set of frames.

17. The method of claim 13, comprising:
   for a set of frames of cells in the input array, determining a minimum analog value among cells in each frame in the set of frames to generate the array of output values, where each output value in the array of output values corresponds to a frame in the set of frames, and indicates the minimum analog value among the cells in the frame in the set of frames.

18. The method of claim 13, comprising:
   applying addresses for a set of frames to the first block and the second block in coordination with said in-place pooling.

19. The method of claim 13, comprising:
   applying a sequence of write pulses for each cell in the second block having a number of write pulses determined according to a corresponding output value in the array of output values.

20. The method of claim 13, comprising:
   applying a sequence of write pulses for each cell in the second block having a pulse duration determined according to a corresponding output value in the array of output values.

21. The method of claim 13, comprising:
   applying a sequence of write pulses for each cell in the second block having a tail length of a write pulse determined according to a corresponding output value in the array of output values.

* * * * *